United States Patent [19]
Reed et al.

[11] Patent Number: 5,919,855
[45] Date of Patent: *Jul. 6, 1999

[54] USE OF MODIFIED CARBON BLACK IN GAS-PHASE POLYMERIZATIONS

[75] Inventors: Thomas Reed, Alpharetta, Ga.; Khaled Mahmud, Tyngsboro, Mass.

[73] Assignee: Cabot Corporation, Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,224

[22] Filed: Feb. 11, 1997

[51] Int. Cl.$^6$ ........................................ C08K 3/00
[52] U.S. Cl. ........................ 524/496; 526/89; 526/194; 526/335; 526/336
[58] Field of Search ............................ 524/496; 526/89, 526/194, 335, 336

[56] References Cited

U.S. PATENT DOCUMENTS

| | | |
|---|---|---|
| T860,001 | 3/1969 | Gessler . |
| 1,999,573 | 4/1935 | Odell . |
| 2,121,535 | 6/1938 | Amon . |
| 2,156,591 | 5/1939 | Jacobson . |
| 2,375,795 | 5/1945 | Krejci . |
| 2,502,254 | 3/1950 | Glassman . |
| 2,514,236 | 7/1950 | Glassman . |
| 2,564,700 | 8/1951 | Krejci . |
| 2,625,492 | 1/1953 | Young . |
| 2,632,713 | 3/1953 | Krejci . |
| 2,793,100 | 5/1957 | Weihe . |
| 2,833,736 | 5/1958 | Glaser . |
| 2,867,540 | 1/1959 | Harris . |
| 2,891,595 | 6/1959 | Kuntz et al. . |
| 3,011,902 | 12/1961 | Jordon . |
| 3,025,259 | 3/1962 | Watson et al. . |
| 3,043,708 | 7/1952 | Watson et al. . |
| 3,094,428 | 6/1963 | Hamilton et al. . |
| 3,203,819 | 8/1965 | Steenken et al. . |
| 3,317,458 | 5/1967 | Clas et al. . |
| 3,335,020 | 8/1967 | Aboytes et al. . |
| 3,390,006 | 6/1968 | Takewell et al. . |
| 3,479,300 | 11/1969 | Rivin et al. . |
| 3,528,840 | 9/1970 | Aboytes . |
| 3,607,813 | 9/1971 | Purcell et al. . |
| 3,622,650 | 11/1971 | Berstein et al. . |
| 3,660,132 | 5/1972 | Illigen et al. . |
| 3,663,285 | 5/1972 | Graf et al. . |
| 3,674,670 | 7/1972 | Erikson et al. . |
| 3,686,111 | 8/1972 | Makhlouf et al. . |
| 3,689,452 | 9/1972 | Burke, Jr. . |
| 3,716,513 | 2/1973 | Burke, Jr. . |
| 3,846,141 | 11/1974 | Ostergren et al. . |
| 3,873,489 | 3/1975 | Thurn et al. . |
| 3,876,603 | 4/1975 | Makhlouf . |
| 3,997,356 | 12/1976 | Thurn et al. . |
| 4,003,751 | 1/1977 | Carder . |
| 4,006,031 | 2/1977 | Ferch et al. . |
| 4,014,833 | 3/1977 | Story . |
| 4,014,844 | 3/1977 | Vidal et al. . |
| 4,061,830 | 12/1977 | Greenberg . |
| 4,071,496 | 1/1978 | Kraus et al. . |
| 4,074,035 | 2/1978 | Powers et al. . |
| 4,108,679 | 8/1978 | Szczepanik et al. . |
| 4,176,361 | 11/1979 | Kawada et al. . |
| 4,204,871 | 5/1980 | Johnson et al. . |
| 4,204,876 | 5/1980 | Bowden . |
| 4,211,578 | 7/1980 | Scott, IV . |
| 4,229,333 | 10/1980 | Wolff et al. . |

(List continued on next page.)

FOREIGN PATENT DOCUMENTS

| | | |
|---|---|---|
| 0 006 190 A1 | 1/1980 | European Pat. Off. . |
| 272127 | 6/1988 | European Pat. Off. . |
| 0 411 160 A1 | 2/1991 | European Pat. Off. . |
| 433229 | 6/1991 | European Pat. Off. . |
| 0 441 987 A2 | 8/1991 | European Pat. Off. . |
| 0 501 227 A1 | 9/1992 | European Pat. Off. . |
| 0 570 966 A1 | 5/1993 | European Pat. Off. . |
| 410152 | 2/1994 | European Pat. Off. . |
| 636591 | 2/1995 | European Pat. Off. . |
| 0 641 823 A1 | 3/1995 | European Pat. Off. . |
| 0 646 621 A1 | 4/1995 | European Pat. Off. . |
| 0 711 805 A1 | 5/1996 | European Pat. Off. . |
| 1164786 | 4/1960 | France . |
| 1215895 | 4/1960 | France . |
| E 72775 | 4/1960 | France . |
| 1224131 | 6/1960 | France . |
| 1 230 893 | 9/1960 | France . |
| 1331889 | 5/1963 | France . |
| 2477593 | 11/1981 | France . |
| 2564489 | 4/1986 | France . |
| 2607528 | 6/1988 | France . |
| 24 26 266 A1 | 12/1975 | Germany . |
| 3170748 | 7/1985 | Germany . |
| 35 02 494 A1 | 8/1985 | Germany . |

(List continued on next page.)

OTHER PUBLICATIONS

Derwent Abstract AN No. 80–03330C, "Sulphonated Carbon Pigment Production by Treating Technical Grade Carbon with Hot Aqueous Acid," SU,A,659, 523, Apr. 1979.

Derwent Abstract AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 198.

Derwent Abstract WPI Acc No. 94–031974/04, Japanese Patent Application No. 92145679, 1992.

Derwent Abstract WPI Acc No. 94–072121/09, Japanese Patent Application No. 9295517, 1992.

(List continued on next page.)

*Primary Examiner*—Edward J. Cain

[57] ABSTRACT

A process for the production of a polymer is disclosed wherein the polymerization occurs in a fluidized bed reactor or a reactor for the gas-phase production of a polymer and in the presence of a catalyst and a modified carbon black. Also disclosed are the polymer particles resulting from this process of the present invention and products made from the polymer particles of the present invention including hoses, such as radiator hoses, tires, and roofing material.

39 Claims, 7 Drawing Sheets

U.S. PATENT DOCUMENTS

| | | |
|---|---|---|
| 4,290,072 | 9/1981 | Mansukhani . |
| 4,293,394 | 10/1981 | Darlington et al. . |
| 4,297,145 | 10/1981 | Wolff et al. . |
| 4,308,061 | 12/1981 | Iwahashi et al. . |
| 4,328,041 | 5/1982 | Wilson . |
| 4,360,627 | 11/1982 | Okado et al. . |
| 4,442,256 | 4/1984 | Miller . |
| 4,451,597 | 5/1984 | Victorius . |
| 4,468,496 | 8/1984 | Takeuchi et al. . |
| 4,476,270 | 10/1984 | Brasen et al. . |
| 4,478,905 | 10/1984 | Neely, Jr. . |
| 4,503,174 | 3/1985 | Vasta . |
| 4,503,175 | 3/1985 | Houze et al. . |
| 4,517,335 | 5/1985 | Wolff et al. . |
| 4,525,521 | 6/1985 | DenHartog et al. . |
| 4,525,570 | 6/1985 | Blum et al. . |
| 4,530,961 | 7/1985 | Nguyen et al. . |
| 4,544,687 | 10/1985 | Schupp et al. . |
| 4,555,535 | 11/1985 | Bednarek et al. . |
| 4,556,427 | 12/1985 | Lewis . |
| 4,590,052 | 5/1986 | Chevallier et al. . |
| 4,597,794 | 7/1986 | Ohta et al. . |
| 4,605,542 | 8/1986 | Harada . |
| 4,605,596 | 8/1986 | Fry . |
| 4,620,993 | 11/1986 | Suss et al. . |
| 4,620,994 | 11/1986 | Suss et al. . |
| 4,650,718 | 3/1987 | Simpson et al. . |
| 4,659,770 | 4/1987 | Vasta . |
| 4,665,128 | 5/1987 | Cluff et al. . |
| 4,670,059 | 6/1987 | Hackleman et al. . |
| 4,680,204 | 7/1987 | Das et al. . |
| 4,681,811 | 7/1987 | Simpson et al. . |
| 4,692,481 | 9/1987 | Kelly . |
| 4,710,543 | 12/1987 | Chattha et al. . |
| 4,713,427 | 12/1987 | Chattha et al. . |
| 4,719,132 | 1/1988 | Porter, Jr. . |
| 4,727,100 | 2/1988 | Vasta . |
| 4,741,780 | 5/1988 | Atkinson . |
| 4,752,532 | 6/1988 | Starka . |
| 4,764,430 | 8/1988 | Blackburn et al. . |
| 4,770,706 | 9/1988 | Pietsch . |
| 4,789,400 | 12/1988 | Solodar et al. . |
| 4,798,745 | 1/1989 | Martz et al. . |
| 4,798,746 | 1/1989 | Claar et al. . |
| 4,808,656 | 2/1989 | Kania et al. . |
| 4,820,751 | 4/1989 | Takeshita et al. . |
| 4,822,844 | 4/1989 | Kawakami et al. . |
| 4,824,900 | 4/1989 | Sakurai . |
| 4,840,674 | 6/1989 | Schwarz . |
| 4,853,037 | 8/1989 | Johnson et al. . |
| 4,866,131 | 9/1989 | Fujimaki et al. . |
| 4,883,838 | 11/1989 | Jung et al. . |
| 4,894,420 | 1/1990 | Scriver . |
| 4,908,397 | 3/1990 | Barsotti et al. . |
| 4,914,148 | 4/1990 | Hille et al. . |
| 4,927,868 | 5/1990 | Schimmel et al. . |
| 4,975,474 | 12/1990 | Barsotti et al. . |
| 4,994,520 | 2/1991 | Mori et al. . |
| 5,008,223 | 4/1991 | Speer et al. . |
| 5,008,335 | 4/1991 | Pettit, Jr. . |
| 5,017,435 | 5/1991 | Barsotti et al. . |
| 5,026,755 | 6/1991 | Kveglis et al. . |
| 5,051,464 | 9/1991 | Johnson et al. . |
| 5,064,719 | 11/1991 | DenHartog et al. . |
| 5,066,733 | 11/1991 | Martz et al. . |
| 5,076,843 | 12/1991 | Acitelli et al. . |
| 5,093,391 | 3/1992 | Barsotti et al. . |
| 5,093,407 | 3/1992 | Komai et al. . |
| 5,100,470 | 3/1992 | Hindagolla et al. . |
| 5,106,417 | 4/1992 | Hauser et al. . |
| 5,109,055 | 4/1992 | Nagasaki et al. . |
| 5,114,477 | 5/1992 | Mort et al. . |
| 5,122,552 | 6/1992 | Johnson . |
| 5,130,004 | 7/1992 | Johnson et al. . |
| 5,130,363 | 7/1992 | Scholl et al. . |
| 5,141,556 | 8/1992 | Matrick . |
| 5,152,801 | 10/1992 | Altermatt et al. . |
| 5,159,009 | 10/1992 | Wolff et al. . |
| 5,162,409 | 11/1992 | Mroczkowski . |
| 5,162,463 | 11/1992 | Baker et al. ............................... 526/74 |
| 5,168,106 | 12/1992 | Babcock et al. . |
| 5,173,111 | 12/1992 | Krishnan et al. . |
| 5,179,191 | 1/1993 | Jung et al. . |
| 5,182,355 | 1/1993 | Martz et al. . |
| 5,184,148 | 2/1993 | Suga et al. . |
| 5,190,582 | 3/1993 | Shinozuka et al. . |
| 5,200,164 | 4/1993 | Medalia et al. . |
| 5,200,477 | 4/1993 | Baker et al. ............................... 526/74 |
| 5,204,404 | 4/1993 | Werner, Jr. et al. . |
| 5,206,295 | 4/1993 | Harper et al. . |
| 5,221,581 | 6/1993 | Palmer et al. . |
| 5,227,425 | 7/1993 | Rauline . |
| 5,229,452 | 7/1993 | Green et al. . |
| 5,232,974 | 8/1993 | Branan, Jr. et al. . |
| 5,236,992 | 8/1993 | Bush ........................................ 524/495 |
| 5,242,751 | 9/1993 | Hartman . |
| 5,264,521 | 11/1993 | Mukai et al. ............................ 524/495 |
| 5,266,361 | 11/1993 | Schwarte et al. . |
| 5,266,406 | 11/1993 | DenHartog et al. . |
| 5,276,097 | 1/1994 | Hoffmann et al. . |
| 5,281,261 | 1/1994 | Lin . |
| 5,286,286 | 2/1994 | Winnik et al. . |
| 5,286,291 | 2/1994 | Bernhardt et al. . |
| 5,288,788 | 2/1994 | Shieh et al. . |
| 5,290,848 | 3/1994 | Palmer et al. . |
| 5,294,253 | 3/1994 | Carlson et al. . |
| 5,302,197 | 4/1994 | Wickramanayke et al. . |
| 5,304,588 | 4/1994 | Boysen et al. .......................... 523/204 |
| 5,310,778 | 5/1994 | Shor et al. . |
| 5,314,945 | 5/1994 | Nickle et al. . |
| 5,314,953 | 5/1994 | Corcoran et al. . |
| 5,319,044 | 6/1994 | Jung et al. . |
| 5,320,738 | 6/1994 | Kaufman . |
| 5,324,790 | 6/1994 | Manring . |
| 5,328,949 | 7/1994 | Sandstrom . |
| 5,334,650 | 8/1994 | Serdiuk et al. . |
| 5,336,716 | 8/1994 | Kappes et al. . |
| 5,336,730 | 8/1994 | Sandstrom . |
| 5,336,753 | 8/1994 | Jung et al. . |
| 5,352,289 | 10/1994 | Weaver et al. . |
| 5,356,973 | 10/1994 | Taljan et al. . |
| 5,366,828 | 11/1994 | Struthers . |
| 5,397,807 | 3/1995 | Hitchcock et al. .................. 423/449.3 |
| 5,401,313 | 3/1995 | Supplee et al. . |
| 5,401,789 | 3/1995 | Wolf et al. . |
| 5,430,087 | 7/1995 | Carlson et al. . |
| 5,554,739 | 9/1996 | Belmont . |
| 5,559,169 | 9/1996 | Belmont et al. . |
| 5,571,311 | 11/1996 | Belmont et al. . |
| 5,575,845 | 11/1996 | Belmont et al. . |

FOREIGN PATENT DOCUMENTS

| | | |
|---|---|---|
| 59/82467 | 5/1984 | Japan . |
| 01/275666 | 11/1989 | Japan . |
| 5-178604 | 7/1993 | Japan . |
| 05/271365 | 10/1993 | Japan . |
| 5339516 | 12/1993 | Japan . |
| 06/025572 | 2/1994 | Japan . |
| 6025572 | 2/1994 | Japan . |
| 6067421 | 3/1994 | Japan . |
| 6073235 | 3/1994 | Japan . |
| 7-30269 | 4/1995 | Japan . |

| | | |
|---|---|---|
| 862018 | 3/1961 | United Kingdom . |
| 1054620 | 12/1965 | United Kingdom . |
| 1139620 | 1/1969 | United Kingdom . |
| 1191872 | 5/1970 | United Kingdom . |
| 1 213 186 | 11/1970 | United Kingdom . |
| 1363428 | 8/1974 | United Kingdom . |
| 2044741 | 10/1980 | United Kingdom . |
| WO 88/02379 | 4/1988 | WIPO . |
| WO 91/15425 | 10/1991 | WIPO . |
| WO 92/13983 | 8/1992 | WIPO . |
| WO 96/18688 | 6/1996 | WIPO . |
| WO 96/18696 | 6/1996 | WIPO . |
| WO 96/37546 | 11/1996 | WIPO . |
| WO 96/37547 | 11/1996 | WIPO . |

OTHER PUBLICATIONS

Derwent Abstract WPI Acc No. 94–121502/15, Japanese Patent Application No. 92241473, 1992.

Derwent Abstract WPI Acc No. 94–124167/15, Japanese Patent Application No. 9133147, 1991.

Derwent Abstract, AN No. 95–183086, "Tire Treated Rubber Composition," Oct. 21, 1993, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964.

Roberts et al., *Basic Principles of Organic Chemistry*, Second Edition, W.A. Benjamin, Inc., Pub., p. 1080.

Allen, "Thermal Ink Jet Printing Trends and Advances," BIS Ink Jet Printing Conference, Oct. 10–12, 1994, Monterey, California.

Schneider, "Continuous Ink Jet," BIS Ink Jet Printing Conference, Oct. 10–12, 1994, Monterey, California.

Major, "Formulating the Future of Automotive Coatings," *Modern Paint and Coatings*, Jul. 1993.

Greenfield, "Fewer Formulation Options Lead to Emphasis on Familiar," *Modern Paint and Coatings*, Jul. 1992.

Schrantz, "Regulations and Competition Push Technological Change," *Modern Paint and Coatings*, Jul. 1994.

"Regulations Focus Formulator Attention on Additives," *Modern Paint and Coatings*, Jul. 1994.

*The Printing Ink Manual*, Fifth Edition, R.H. Leach et al., Blueprint Press, Chapters 8, 9, and 10.

Tsubokawa, "Functionalization of Carbon Black by Surface Grafting of Polymers," *Polym. Sci.*, vol. 17, pp. 417–470, 1992.

Wolff et al., "The Influence of Modified Carbon Blacks on Viscoelastic Compound Properties," *Kautschuk & Gummi*, Kuststoffe 44, Jahrgang, Nr. Oct. 1991.

Bourdillon et al., "Immobilization of Glucose Oxidase on a Carbon Surface Derivatized by Electrochemical Reduction of Diazonium Salts," *J. Electroanal. Chem.*, vol. 336, pp. 113–123, 1992.

Ohkita et al., "The Reaction of Carbon Black Surface with 2,2–Diphenyl–1–Picrylhydrazyl," *Carbon*, vol. 10, No. 5, pp. 631–636, 1972.

Watson, "Chemical Aspects of Reinforcement," Compounding Research Department, Dunlop Research Center, Dunlop Rubber Co., pp. 987–999.

Garten et al., "Nature of Chemisorptive Mechanisms in Rubber Reinforcement," Commonwealth Scientific and Industrial Research Organ., Div. of Industrial Chem., Melbourne, Australia, pp. 596–609.

Donnet et al., "Chimie Superficielle et Sites Privilegies Des Charges Fines," Extrait de la Revue Generale du Caoutchoic, Jul. 1959.

*Ullmann's Encyclopedia of Industrial Chemistry*, Fifth Edition, vol. A–8, pp. 508–509, 1987.

Donnet et al., "Sur la Structure Aroxylique des Groupements Quinoniques et des Radicaux Libres Presentes den Surface des Noirs de Carbon," *Ref. Gen. Caoutchouc Plastiques*, vol. 42, No. 3, pp. 389–392, 1965 (with English Abstract).

Yamaguchi et al., "Novel Carbon Black/Rubber Coupling Agent," *Kautschuk & Gummi*, Kunstoffe 42, Jahrgang, Nr. May 1989.

Studebaker et al., "Oxygen–Containing Groups on the Surface of Carbon Black," *Industrial and Engineering Chemistry*, vol. 48, No. 1, pp. 162–166, Jan. 1956.

Zoheidi et al., "Role of Oxygen Surface Groups in Catalysis of Hydrogasification of Carbon Black by Potassium Carbonate," *Carbon*, vol. 25, No. 6, pp. 809–819, 1987.

Scherrer, "Coloration of Ink Jet Inks," Presentation at BIS Ink Jet Printing Conference, Oct. 10–12, 1994, Monterey.

*Ink Jet Printing: 1994 Overview and Outlook*, Chapter 7.

*The Printing Ink Manual*, Fourth Edition, Chapter 2, Leach et al., Eds., 1988.

Andreottoia, *Ink Jet Ink Technology*, pp. 531–544.

Gregory, *High–Technology Applications of Organic Colorants*, Chapter 9, "Ink–Jet Printing," 1991.

PCT Search Report, PCT/US 95 16452, Apr. 17, 1996.
PCT Search Report, PCT/US 95/16195, Apr. 19, 1996.
PCT Search Report, PCT/US 95/16281, Apr. 26, 1996.
PCT Search Report, PCT/IB 95/01154, Apr. 29, 1996.
PCT Search Report, PCT/US 95/16453, May 15, 1996.
Chemical Abstract No. 113:116901, Nov. 6, 1989.
Chemical Abstract No. 120325954, Feb. 1, 1994.

RAPRA Abstract No. 432845, "Compounding Heat Resistant Non–Black EPDM Rubber Compounding Report," Dec. 1990.

RAPRA Abstract No. 417612, "Review: Polymer–Filler Interactions in Rubber Reinforcement," Oct. 1990.

RAPRA Abstract No. 403202, "Organotitanate, Zirconate Effect on Elastomers," Jun. 1990.

RAPRA Abstract No. 394030, "Mechanical Properties of Natural Rubber/Grafted Cellulose Fibre Composites," 1990.

RAPRA Abstract No. 390600, "Application of Coupling Agents to Elastomers," 1989.

RAPRA Abstract No. 00388935, "Light Coulored Fillers in Polymers," Nov. 1989.

Dialog Abstract EMA No. 8602–C1–D–0297, "Carbon Black is Better With Silica," Oct. 1985.

RAPRA Abstract No. 00343229, "White and Black Fillers for Rubber Compounds," Dec. 1986.

RAPRA Abstract No. 00177481, "Ethylene–Propylene Rubbers," 1981.

RAPRA Abstract No. 00105623, "Putting Performance Into Thermosets with Titanium Coupling Agents," Oct. 1976.

RAPRA Abstract No. 00056893, "Applications for Silane Coupling Agents in the Automotive Industry," Oct. 1975.

RAPRA Abstract No. 00002608, "Ground Rice Hull Ash as a Filler for Rubber," Oct. 1974.

RAPRA Abstract No. 00000937, "Reduction of Heat Build–up in Mineral–Filled Elastomers Through the Use of Silane Coupling Agents," May 1973.

RAPRA Abstact No. 00105623, "Putting Performance into Thermosets With Titanium Coupling Agents," Oct. 1976.
Derwent Abstract, Japanese Patent Publication No. 80–73657, Mar. 19, 1996.
Derwent Abstract, WPI Acc No. 78–73373A/41, Japanese Patent Application No. 53–100190, 1978.
Derwent Abstract, WPI Acc No. 95–019436/03, Japanese Patent Application No. 63–06289, 1994.
Derwent Abstract, WPI Acc No. 92–369382/45, Japanese Patent Application No. 4–270199, 1992.
Derwent Abstract, WPI Acc No. 90–335599/45, DD No. 279537, 1990.
Derwent Abstract, WPI Acc No. 90–128540/17, Japanese Patent Application No. 2–077483, 1990.
Derwent Abstract, WPI Acc No. 88–261546/37, Japanese Patent Application No. 63–190800, 1988.
Derwent Abstract, WPI Acc No. 87–034097/05, Japanese Patent Application No. 61–291659, 1986.
Derwent Abstract, WPI Acc No. 88–052867/08, Japanese Patent Application No. 63–008442, 1988.
Chemical Abstract vol. 114, No. 14, No. 124715d (1990).
Chemical Abstract vol. 112, No. 18, No. 160248w, 1988.
Chemical Abstract vol. 110, No. 6, No. 48370n, 1966.
Chemical Abstract vol. 69, No. 18, No. 68396p, 1967.
Chemical Abstract vol. 94, No. 16, No. 122906m, 1980.
Chemical Abstract vol. 66, No. 24, No. 105491b, 1966.
Chemical Abstract vol. 67, No. 2, No. 3806m, 1966.
Chemical Abstract vol. 102, No. 4, No. 28447z, 1984.
Chemical Abstract vol. 100, No. 22, No. 176125s, 1983.
Chemical Abstract vol. 106, No. 28, No. 224473b, 1987.
Chemical Abstract vol. 94, No. 8, No. 48630y, 1980.
Chemical Abstract vol. 88, No. 22, No. 161466p, 1978.
Chemical Abstract vol. 104, No. 12, No. 90590k, 1985.
Chemical Abstract vol. 105, No. 8, No. 61488y, 1985.
Ouyang et al., "Carbon Black Effects on Treadwear," Presented at a Meeting of the Rubber Division, American Chemical Society, Las Vegas, Nevada, May 29–Jun. 1, 1990.
Agostini, et al., "New Compound Technology," Goodyear Technical Center, Luxembourg.
Dialog Abstract of Japanese Application No. 4–362009, 1992.
Dialog Abstract of Japanese Application No. 4–276000, 1992.
Studebaker et al., "The Rubber Compound and its Composition," *Science and Technology of Rubber*, Academic Press, 1978, Chapter 9, pp. 367–375.
"Tires," Reprinted from *Encyclopedia of Polymer Science and Engineering*, vol. 16, Second Edition, 1969, pp. 834–861.
Tsubokawa et al., "Grafting Onto Carbon Black Having Few Functional Groups," Shikizai Kyokaisha, vol. 66, No. 5 (1993), Abstract Only.
J.B. Donnet et al., "Radical Reactions and Surface Chemistry of Carbon Black," Bull. Soc. Chim. 1960 (Abstract Only).
Concise Encyclopedia of Polymer Science and Engineering, Wiley, 1990, pp. 104–105.
Carbon (Carbon Black) Reprinted from Kirk–Othmer: Encyclopedia of Chemical Technology, vol. 4, Third Edition, pp. 631–643, 1978.
Delamar et al., J. Am. Chem. Soc. 1992, 114, 5883–5884.
Kang, "Water–Based Ink–Jet Ink," J. Imaging Science, vol. 35, No. 3, May/Jun., 1991, pp. 195–201.

25 nm
N234 Carbon Black 25 nm
N234 Carbon
Black-HF Treated 25 nm
OMTS Carbon Black 25 nm
OMTS Carbon
Black-HF Treated

USE OF MODIFIED CARBON BLACK IN GAS-PHASE POLYMERIZATIONS

BACKGROUND OF THE INVENTION

1. Field of the Invention

The present invention relates to gas phase polymerization using modified carbon black and further relates to the products made from gas phase polymerization using modified carbon black.

2. Discussion of the Related Art

Gas phase polymerization has been described as a means of polymerizing polymers such as ethylene/propylene diene monomer (EPDM) and diene-type polymers such as butadiene rubber, without the use of solvents. One advantage of this approach is the lower cost of the resulting polymer because there is no need to recover and recycle solvents. Another advantage is the granular form of the polymer which facilitates mixing of the polymer, e.g., elastomer, with the other ingredients in a formulation. One problem encountered in gas-phase polymerization which must be overcome is the tendency of the polymer particles formed in the gas phase to stick together in the reactor, thereby giving undesirably large lumps of polymer. This problem has led to the term "sticky polymer" which has been defined as a polymer being particulate at temperatures below the sticking or softening temperature but forming agglomerates at temperatures above the sticking or softening temperature. Sticking of the polymer particles has been prevented at times by incorporating filler materials such as carbon black, silica, and clay in the polymerization process which functions as a partitioning agent to keep the polymeric particles separated. The surface chemistries of these filler materials can be very important since the filler materials have the ability to influence the efficiency of the fillers to function as partitioning agents and can affect the efficiency of the polymerization catalyst that is present in gas-phase polymerization. In some cases, attempts have been made to alter the surface properties of the fillers to achieve the necessary partitioning properties and to reduce or eliminate the filler's effects on the polymerization catalyst.

However, there is a need to find improved fillers which act as acceptable partitioning agents, thus keeping the polymeric particles separated and, preferably affecting the resulting polymer in such a way as to improve its properties.

SUMMARY OF THE INVENTION

One feature of the present invention is to provide a gas-phase polymerization method which uses modified carbon blacks as fillers to function as partitioning agents to keep the polymeric particles separated.

An additional feature of the present invention is to use particular modified carbon blacks to further enhance the properties of the polymeric particles resulting from the gas-phase polymerization.

It is an additional feature of the present invention to provide polymeric or resin particles which incorporate the particular modified carbon blacks and which are made by the gas-phase polymerization method.

Additional features and advantages of the present invention will be set forth in part in the description which follows, and in part will be apparent from the description, or may be learned by the practice of the present invention. The objectives and other advantages of the present invention may be realized and obtained by means of the elements and combinations particularly pointed out in the written description and the claims.

To achieve these and other advantages, and in accordance with the purpose of the present invention, as embodied and broadly described herein, the present invention relates to a process for the production of polymers using gas-phase polymerization. This process comprises conducting polymerization in a fluidized bed reactor in the presence of a catalyst and in the presence of a modified carbon black as that term is understood herein.

The present invention additionally relates to the polymer resulting from the above-described process which comprises a polymer and a modified carbon black. One type of particles resulting from the above-described process of the present invention is a particle having a polymer mass as its core and a shell comprising a mixture of polymer and modified carbon black.

It is to be understood that both the foregoing general description and the following detailed description are exemplary and explanatory only and are intended to provide further explanation of the present invention, as claimed.

The accompanying drawings, which are incorporated in and constitute a part of this specification, illustrate aspects of the present invention and together with the description serve to explain the principles of the present invention.

DETAILED DESCRIPTION OF THE PRESENT INVENTION

Figure 1:
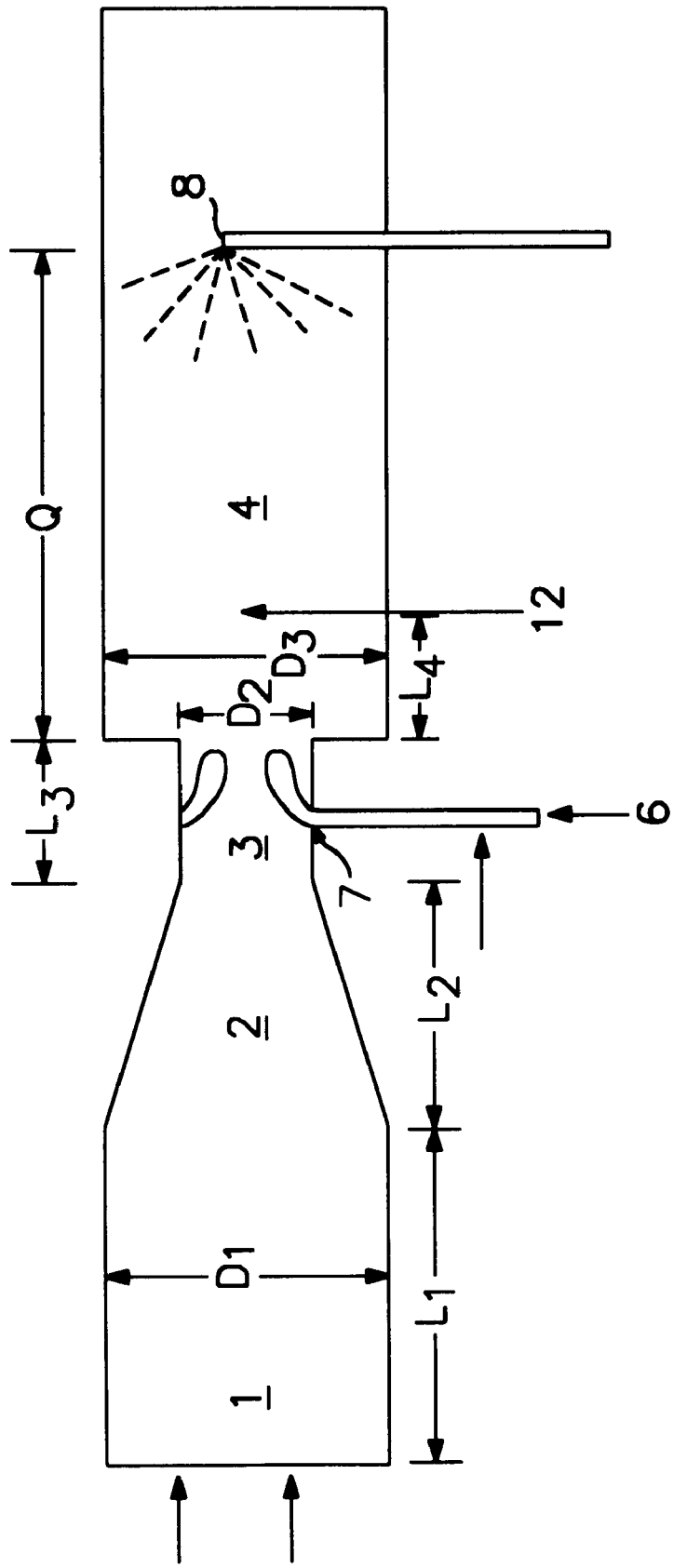
FIG. 1 is a schematic view of a portion of one type of carbon black reactor which may be used to produce the treated carbon blacks of the present invention.
Figure 2:
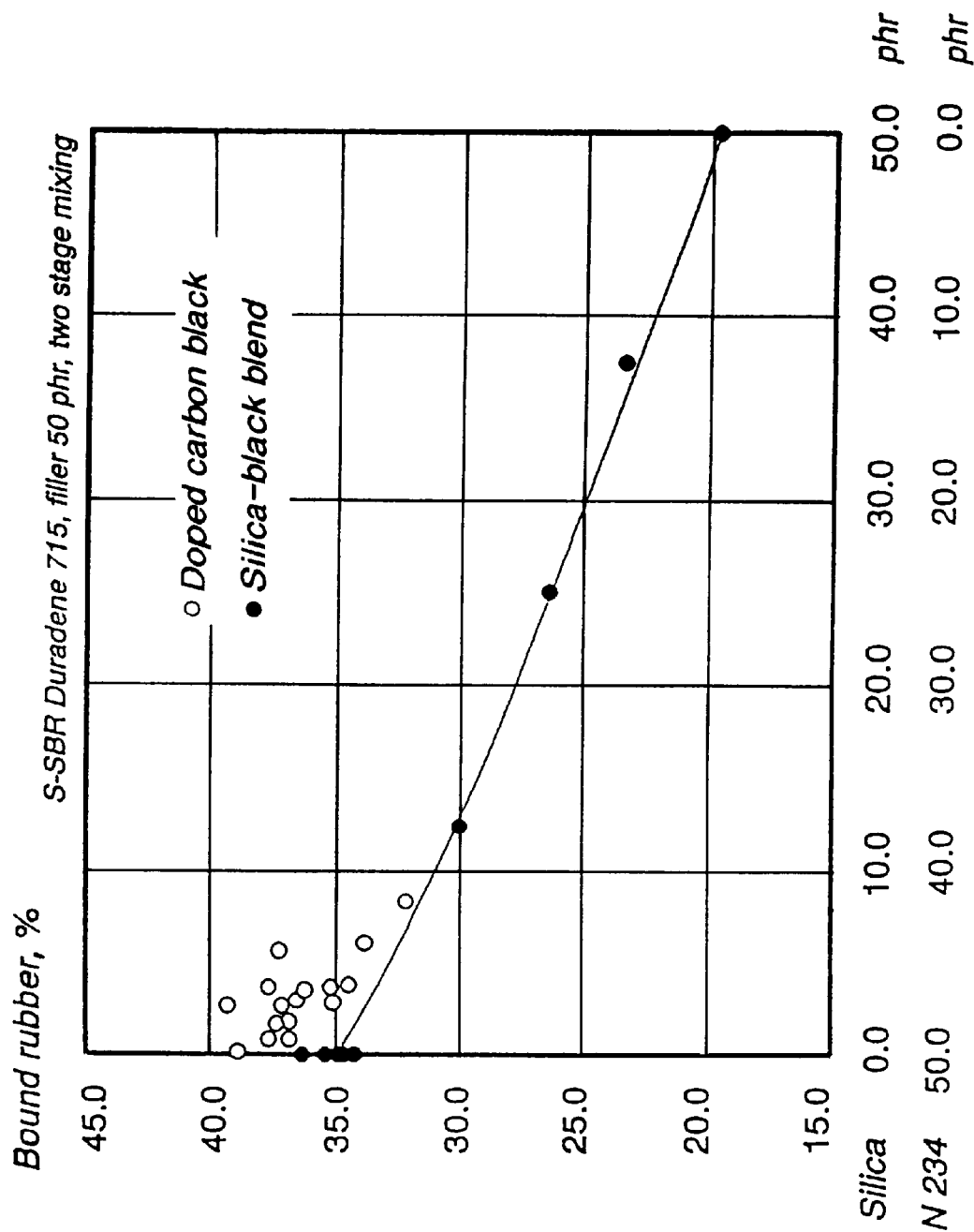
FIG. 2 is a graph demonstrating the results of a bound rubber test carried out on elastomeric compositions of the present invention.
Figure 3A:
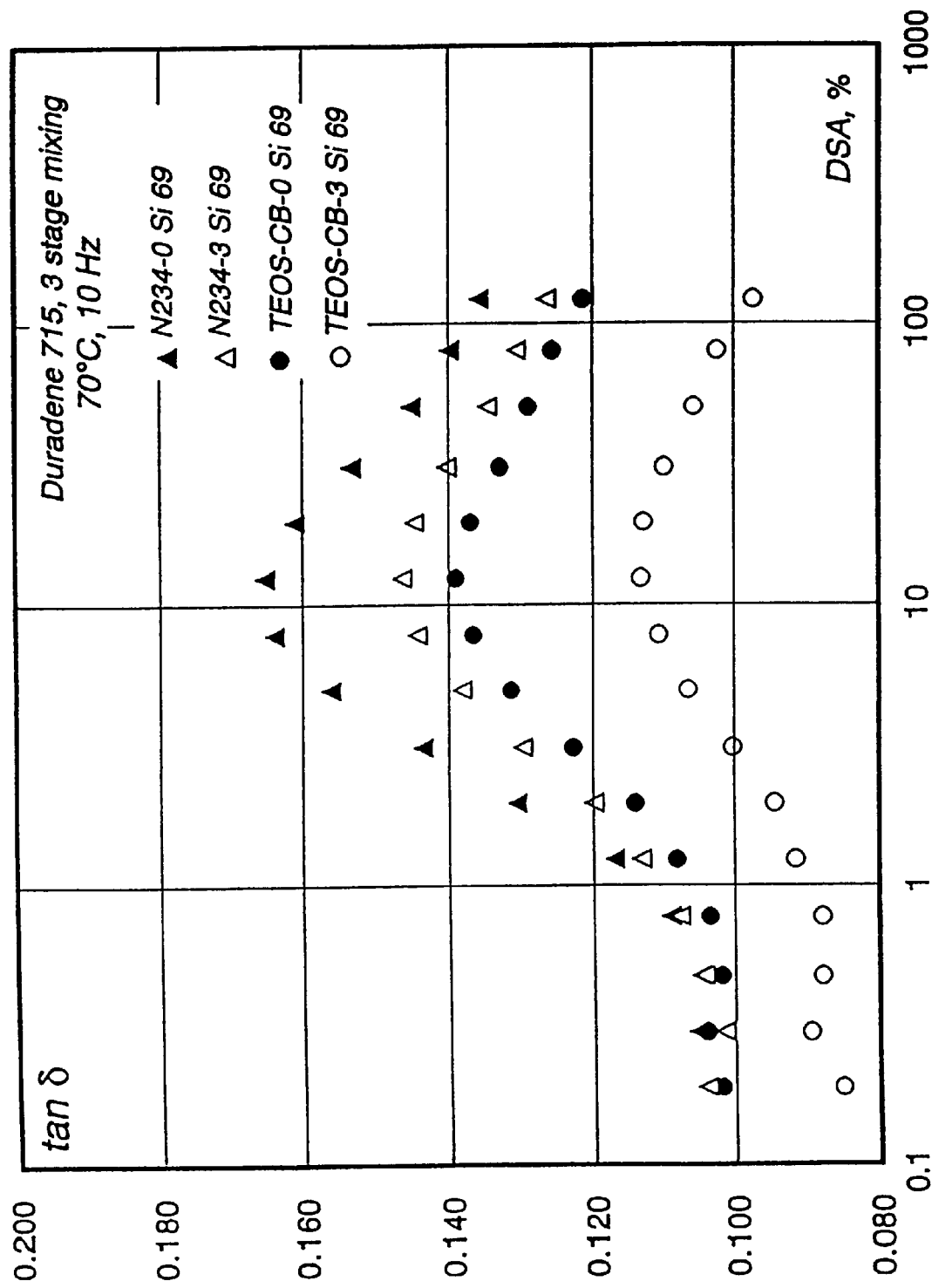
FIGS. 3a, 3b and 3c are graphs demonstrating hysteresis values measured at different temperatures and strains on elastomeric compositions of the present invention.
Figure 3B:
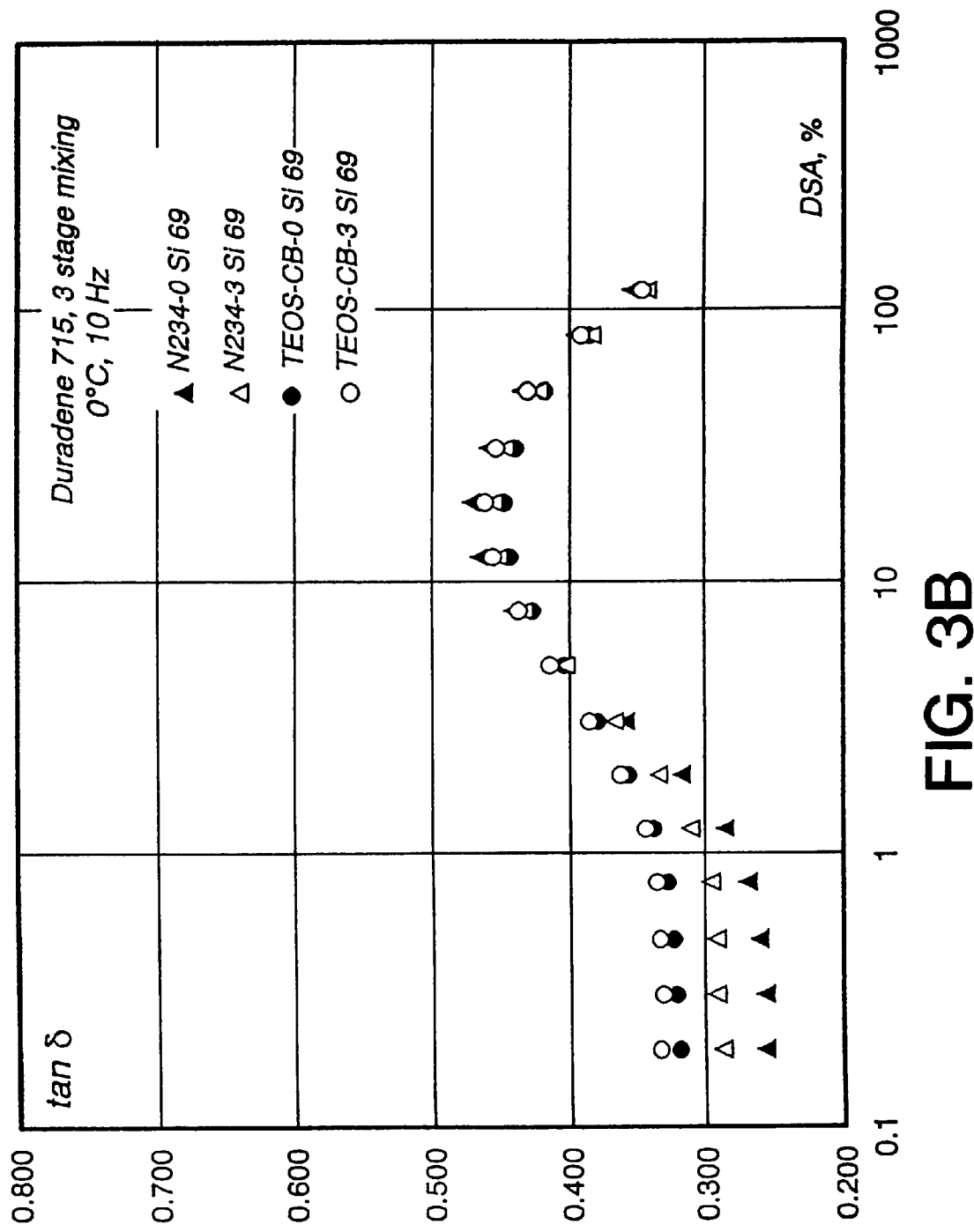
Figure 3C:
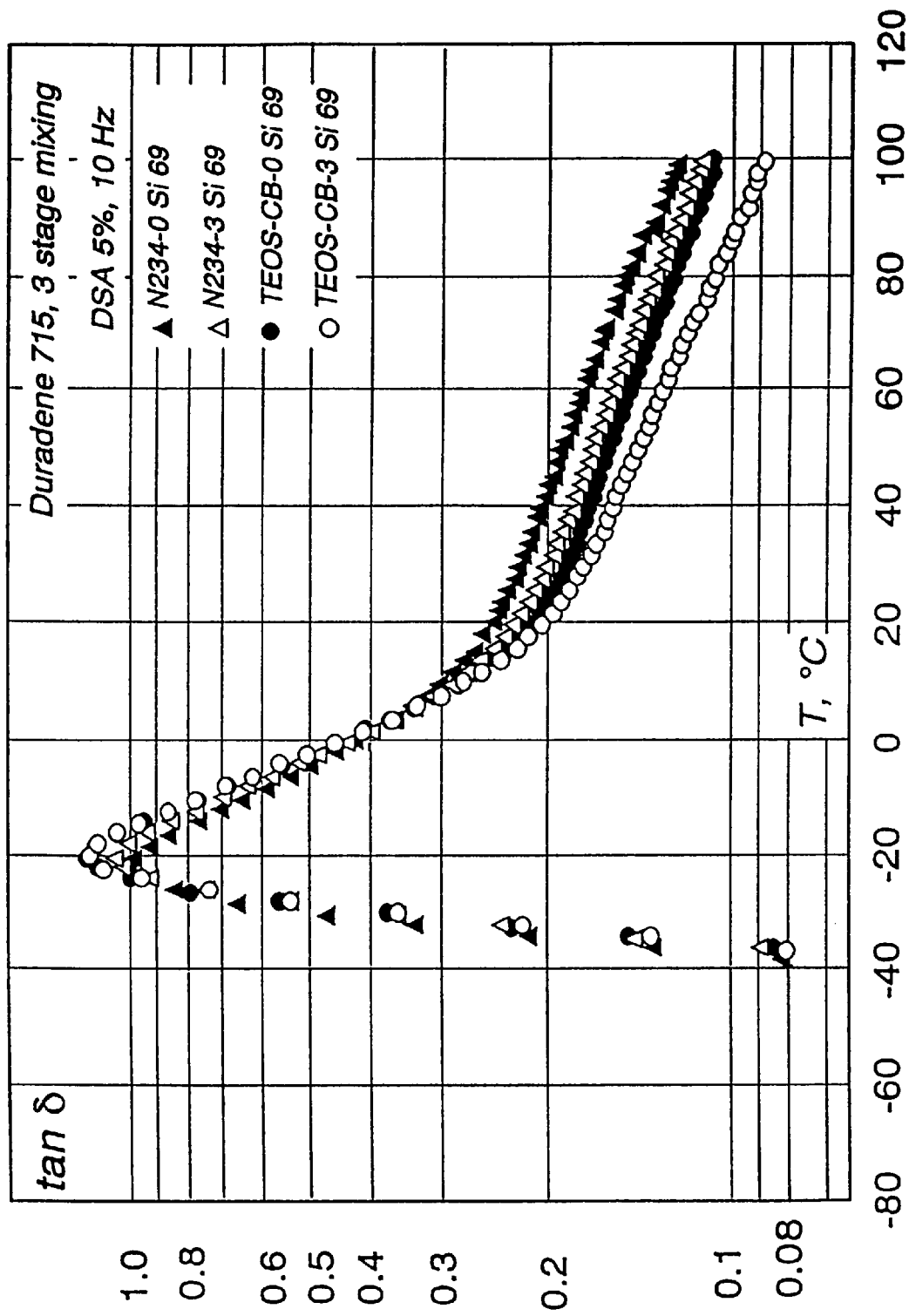
Figure 4A:
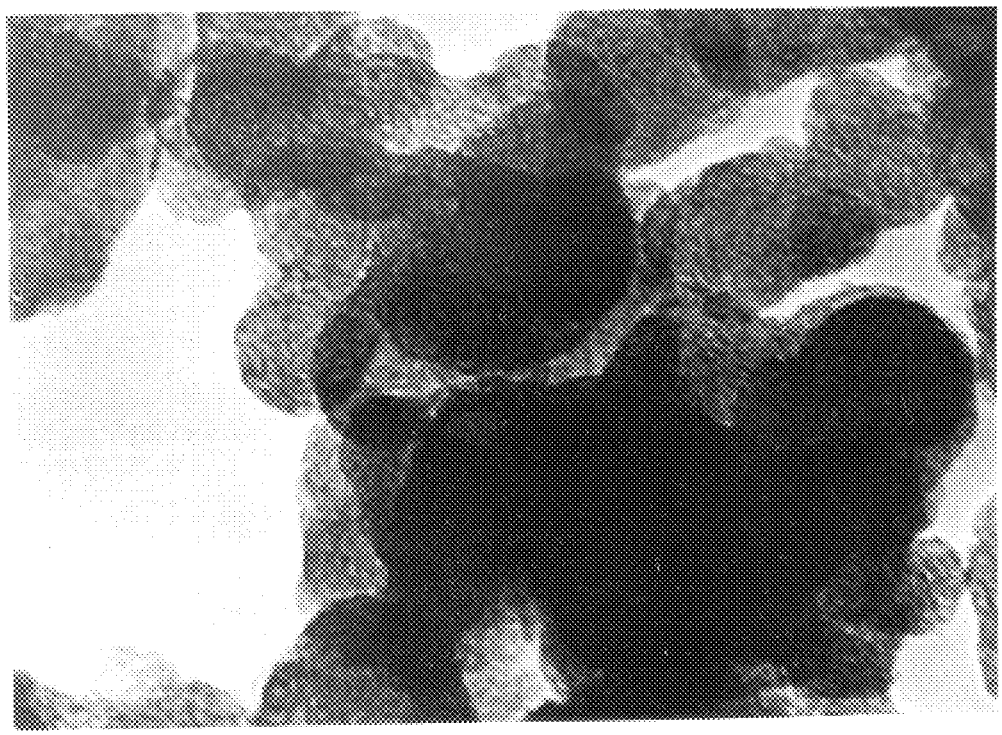
FIGS. 4a–4d are photomicrographs comparing carbon blacks useful in the present invention and prior art carbon blacks.
Figure 4B:
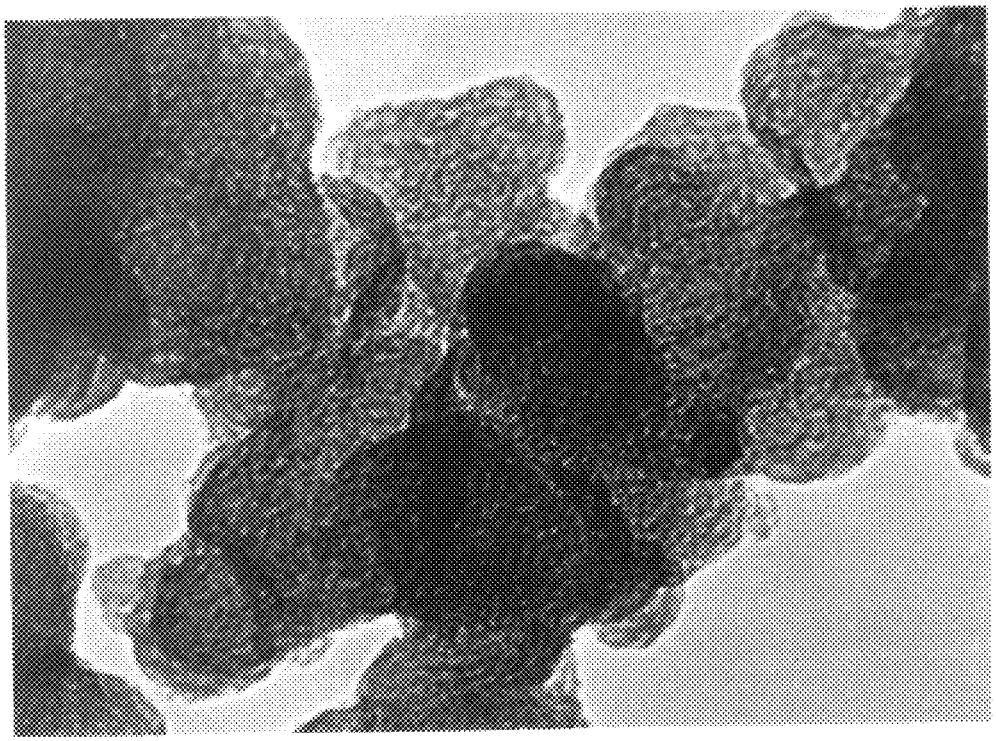
Figure 4C:
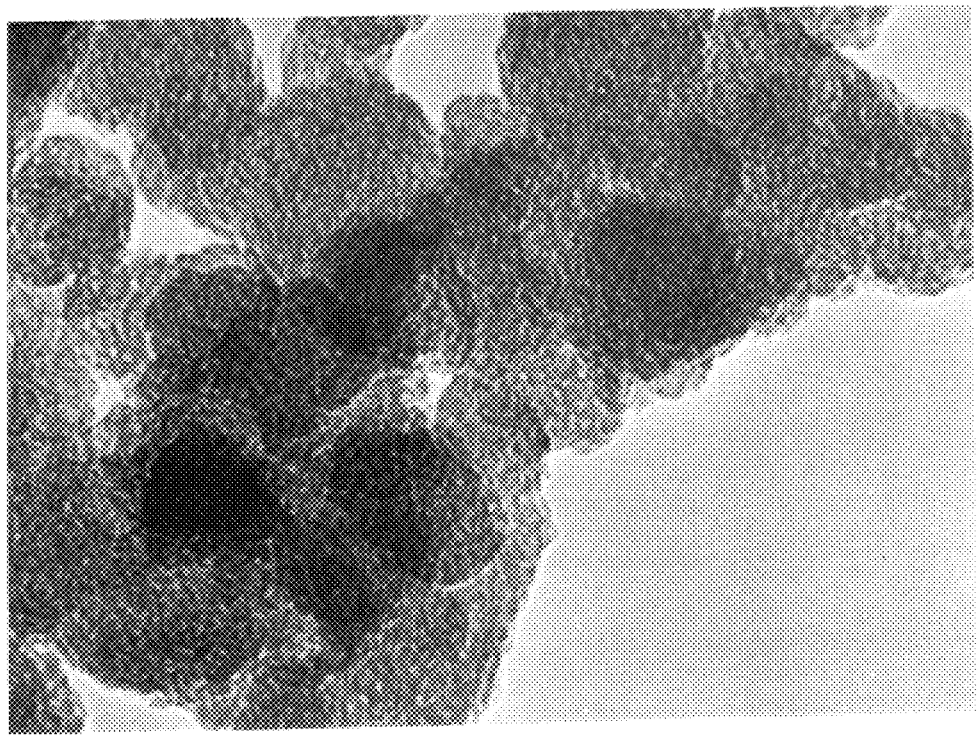
Figure 4D:
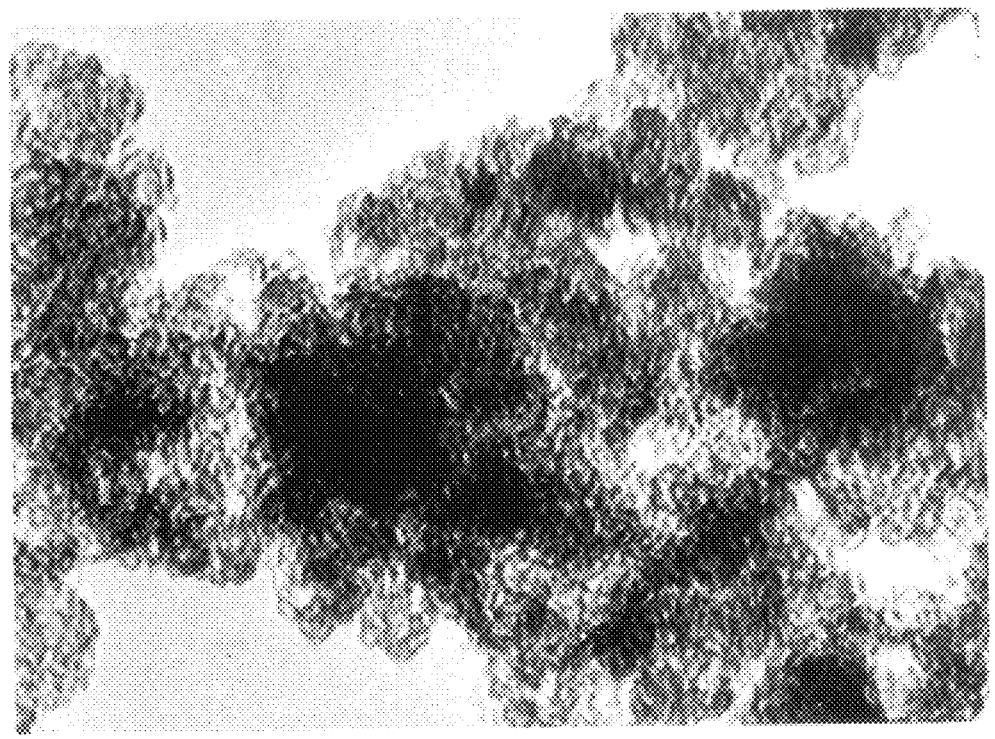

In the present invention, polymers are made using gas-phase polymerization. In this process, polymerization occurs in a fluidized bed reactor or a reactor for gas-phase production of polymers. The polymerization occurs in the presence of a catalyst and in the presence of a modified carbon black, as that term is to be defined herein.

The details of the type of fluidized bed reactor or reactors for the gas-phase production of polymers which can be used for purposes of the process of the present invention are described in U.S. Pat. Nos. 4,558,790, 5,162,463, 5,200,477, and 5,304,588, all incorporated in their entirety herein by reference. The process set forth in PCT International Publication No. WO 88/02379, published April 1988, can also be used for purposes of the present invention. The polymers produced by the process of the present invention can involve a process for producing polymers wherein the polymerization reaction temperature is in excess of the softening temperature of the resulting polymer or polymerization temperatures can be used which are not in excess of the softening temperatures of the produced polymers.

Examples of polymers which can be produced by the present invention include, but are not limited to, ethylene/propylene/diene monomer and diene-type elastomers such as polybutadiene polymers or copolymers. Other examples of polymers which can be produced by the process of the present invention include ethylene/propylene rubbers, polybutadiene rubbers, high ethylene content propylene/ethylene block copolymers, poly(1-butene), very low density polyethylenes, ethylene/propylene/ethylidenenorbornene, and ethylene/propylene hexadiene terpolymers of low density. Additional types of polymers that can be made using the process of the present invention are further described in U.S. Pat. No. 5,304,588 and WO 88/02379.

The types of catalyst that can be used in the process of the present invention, as well as amounts of the other starting materials, are also described in U.S. Pat. No. 5,304,588.

Generally, about 0.3 to about 80 wt %, based on the weight of the final product, modified carbon black can be used in the process of the present invention. Preferably, the mean particle size of the modified carbon black is from about 0.01 to about 10 mm.

The term "modified carbon black" means a) a silicon-treated carbon black (i.e., a particulate comprising carbon black and a silicon-containing species and the silicon-containing species are dispersed within the particulate, wherein the particulate is not a physical mixture of silica and carbon black). An alternative way to describe the silicon-treated carbon black is an aggregate comprising a carbon phase and a silicon compound containing phase. The aggregate can comprise one or more primary particles, wherein the primary particle comprises a carbon phase and a silicon-compound containing phase. For purposes of convenience, the term "silicon-treated carbon black" will be used hereinafter;

b) a silica-coated carbon black;

c) a carbon black having an attached organic group(s);

d) a silicon-treated carbon black having an attached organic group(s);

e) a silica-coated carbon black having an attached organic group(s); or f) a mixture of one or more of the above a)–e).

Silicon-Treated Carbon Black

In the silicon-treated carbon black, a silicon-containing species, including but not limited to, oxides and carbides of silicon, may be distributed through at least a portion of the aggregate comprising a carbon phase and is an intrinsic part of the aggregate.

The aggregates used in the present invention do not represent a mixture of discrete carbon black aggregates and discrete silica aggregates. Rather, the aggregates of the present invention include a carbon phase and at least one silicon-containing region either at the surface of or within the aggregate. In other words, the aggregate comprises a carbon phase and a silicon compound containing phase. The silicon compound containing phase can be inorganic or organic silicon compound.

When the silicon-treated carbon black is examined under STEM-EDX, the silicon signal corresponding to the silicon-containing species is found to be present in the individual aggregates. By comparison, for example, in a physical mixture of silica and carbon black, STEM-EDX examination reveals distinctly separate silica and carbon black aggregates.

The silicon-treated carbon blacks may be obtained by manufacturing the carbon black in the presence of volatizable silicon-containing compounds. Such carbon blacks are preferably produced in a modular or "staged," furnace carbon black reactor as depicted in FIG. 1. The furnace carbon black reactor has a combustion zone 1, with a zone of converging diameter 2; a feedstock injection zone with restricted diameter 3; and a reaction zone 4.

To produce carbon blacks with the reactor described above, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor or liquid streams such as natural gas, hydrogen, methane, acetylene, alcohols, or kerosene. It is generally preferred, however, to use fuels having a high content of carbon-containing components and in particular, hydrocarbons. The ratio of air to fuel varies with the type of fuel utilized. When natural gas is used to produce the carbon blacks of the present invention, the ratio of air to fuel may be from about 10:1 to about 1000:1. To facilitate the generation of hot combustion gases, the oxidant stream may be pre-heated.

The hot combustion gas stream flows downstream from zones 1 and 2 into zones 3 and 4. The direction of the flow of hot combustion gases is shown in FIG. 1 by the arrow. Carbon black feedstock 6 is introduced at point 7 into the feedstock injection zone 3. The feedstock is injected into the gas stream through nozzles designed for optimal distribution of the oil in the gas stream. Such nozzles may be either single or bi-fluid. Bi-fluid nozzles may use steam or air to atomize the fuel. Single-fluid nozzles may be pressure atomized or the feedstock can be directly injected into the gas-stream. In the latter instance, atomization occurs by the force of the gas-stream.

Carbon blacks can be produced by the pyrolysis or partial combustion of any liquid or gaseous hydrocarbon. Preferred carbon black feedstocks include petroleum refinery sources such as decanted oils from catalytic cracking operations, as well as the by-products from coking operations and olefin manufacturing operations.

The mixture of carbon black-yielding feedstock and hot combustion gases flows downstream through zone 3 and 4. In the reaction zone portion of the reactor, the feedstock is pyrolyzed to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. Q is the distance from the beginning of reaction zone 4 to quench point 8, and will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is optionally subjected to a pelletization step.

The silicon treated carbon blacks of the present invention may be made by introducing a volatilizable silicon containing compound into the carbon black reactor at a point upstream of the quench zone. Useful volatilizable compounds include any compound, which is volatilizable at carbon black reactor temperatures. Examples include, but are not limited to, silicates such as tetraethoxy orthosilicate (TEOS) and tetramethoxy orthosilicate, silanes such as, tetrachloro silane, and trichloro methylsilane; and volatile silicone polymers such as octamethylcyclotetrasiloxane (OMTS). The flow rate of the volatilizable compound will determine the weight percent of silicon in the treated carbon black. The weight percent of silicon in the treated carbon black can range from about 0.1% to about 99.9%, preferably from about 0.1% to 25%, and more preferably about 0.5% to about 10%, and most preferably about 2% to about 6%. It has been found that injecting silicon containing compound into the carbon black reactor results in an increase in the structure (e.g., CDBP) of the product. This is desirable in many applications of carbon black and would provide additional advantages in the partitioning characteristics of the modified carbon black.

The volatilizable compound may be premixed with the carbon black-forming feedstock and introduced with the feedstock into the reaction zone. Alternatively, the volatilizable compound may be introduced to the reaction zone separately from the feedstock injection point. Such introduction may be upstream or downstream from the feedstock injection point, provided the volatilizable compound is introduced from the quench zone. For example, referring to FIG. 1, the volatilizable compound may be introduced to zone Q at point 12 or any other point in the zone. Upon volatilization and exposure to high temperatures in the reactor, the compound decomposes, and reacts with other species in the reaction zone, yielding silicon treated carbon black, such that the silicon, or silicon containing species, becomes an intrinsic part of the aggregate also comprising the carbon phase. An example of a silicon-containing species is silica. Besides volatilizable compounds, decomposable compounds which are not necessarily volatilizable can also be used to yield the silicon-treated carbon black.

As discussed in further detail below, if the volatilizable compound is introduced substantially simultaneously with the feedstock, the silicon-treated regions are distributed throughout at least a portion of the aggregate of the present invention which also comprises the carbon phase.

The volatilizable compound can alternatively be introduced to the reaction zone at a point after carbon black formation has commenced but before the reaction stream has been subjected to the quench. In this embodiment, the silicon-treated carbon black is obtained in which a silicon containing species is present primarily at or near the surface of the aggregate. Further details of the silicon-treated carbon black can be found in U.S. patent application Ser. Nos. 08/446,141; 08/528,895; and 08/750,017, all incorporated in their entirety by reference herein.

Silicon-Coated Carbon Black

The silica coated carbon blacks may be obtained by coating a silicon oxide compound onto at least a portion of the carbon black aggregate. Any carbon black may be used.

The carbon black may be fully or partially coated with a silicon oxide compound by a number of different methods. One such method is taught in Japanese (Kokai) patent application No. HEI 5(1993)-178604. To prepare the silica coated carbon black, an organo-silicate such as tetraethylorthosilicate, or a silane such as tetraethoxysilane, may be diluted with a solvent such as methanol to produce a silicon compound solution having a concentration of between about 1 and 20% by weight of the silicon compound. Another solution is made by adding 5–20% of a 28% aqueous ammonia solution to ethanol.

A carbon black is then slowly added to the ammonia solution, while continuously stirring the mixture. Simultaneously, the silicon compound solution is added dropwise to the ammonia solution. After up to several hours of this operation, the silica coated carbon black is extracted, filtered and dried. A carbon black coated with silica, thus made, is expected to impart advantages over carbon black, silica, or mixtures thereof in an elastomer. Without being bound by theory, it is believed that such a silica coated carbon black would have more functional groups, specifically silanols, on its surface, allowing for greater interaction with a coupling agent, thereby improving hysteresis when compounded with an elastomer compared to uncoated carbon black. The silica coated carbon black is also expected to impart significant advantages over silica in an elastomer. Accordingly, less coupling agent would be required, resulting in reduced compounding costs. The partially coated carbon blacks which can be used in the present invention may further have an organic groups attached, such as the groups described below. Further details of the silicon coated carbon black can be found in U.S. patent application Ser. Nos. 08/446,140; 08/528,896; and 08/750,016, all incorporated in their entirety by reference herein.

Carbon Black Having an Attached Organic Group

One process for attaching an organic group to the carbon black involves the reaction of at least one diazonium salt with a carbon black in the absence of an externally applied current sufficient to reduce the diazonium salt. That is, the reaction between the diazonium salt and the carbon black proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazonium salt reacts with a carbon black in a protic reaction medium. Mixtures of different diazonium salts may be used in this process of the invention. This process can also be carried out under a variety of reaction conditions.

Preferably, in both processes, the diazonium salt is formed in situ. If desired, in either process, the carbon black product can be isolated and dried by means known in the art. Furthermore, the resultant carbon black product can be treated to remove impurities by known techniques. The various preferred embodiments of these processes are discussed below.

These processes can be carried out under a wide variety of conditions and in general are not limited by any particular condition. The reaction conditions must be such that the particular diazonium salt is sufficiently stable to allow it to react with the carbon black. Thus, the processes can be carried out under reaction conditions where the diazonium salt is short lived. The reaction between the diazonium salt and the carbon black occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reactions, Mechanisms, and Structures*, 4th Ed., (Wiley, 1992). According to this invention, a diazonium salt is an organic compound having one or more diazonium groups.

The diazonium salt may be prepared prior to reaction with the carbon black or, more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNO_2$ or $HNO_3/NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is paraaminobenzene-sulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in basic media.

However, the diazonium salt need only be sufficiently stable to allow reaction with the carbon black. Thus, the processes can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Reagents can be added to form the diazonium salt in situ, to a suspension of carbon black in the reaction medium, for example, water. Thus, a carbon black suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a carbon black limits the processes of the invention.

The processes can be carried out in any reaction medium which allows the reaction between the diazonium salt and the carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbon black can take place with any type of carbon black, for example, in fluffy or pelleted form. In one embodiment designed to reduce production costs, the reaction occurs during a process for forming carbon black pellets. For example, a carbon black product of the invention can be prepared in a dry drum by spraying a solution or slurry of a diazonium salt onto a carbon black. Alternatively, the carbon black product can be prepared by pelletizing a carbon black in the presence of a solvent system, such as water, containing the diazonium salt or the reagents to generate the diazonium salt in situ. Aqueous solvent systems are preferred. Accordingly, another embodiment provides a process for forming a pelletized carbon black comprising the steps of: introducing a carbon black and an aqueous slurry or solution of a diazonium salt into a pelletizer, reacting the diazonium salt with the carbon black to attach an organic group to the carbon black, and pelletizing the resulting carbon black having an attached organic group. The pelletized carbon black product may then be dried using conventional techniques.

In general, the processes produce inorganic by-products, such as salts. In some end uses, such as those discussed below, these by-products may be undesirable. Several possible ways to produce a carbon black product without unwanted inorganic by-products or salts are as follows:

First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process may also produce organic by-products. They can be removed, for example, by extraction with organic solvents. Other ways of obtaining products without unwanted organic by-products may be known to those of skill in the art and include washing or removal of ions by reverse osmosis.

The reaction between a diazonium salt and a carbon black forms a carbon black product having an organic group attached to the carbon black. The diazonium salt may contain the organic group to be attached to the carbon black. It may be possible to produce the carbon black products of this invention by other means known to those skilled in the art.

The organic group may be an aliphatic group, a cyclic organic group, or an organic compound having an aliphatic portion and a cyclic portion. As discussed above, the diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hindrance of a substituted organic group increases, the number of organic groups attached to the carbon black from the reaction between the diazonium salt and the carbon black may be diminished.

When the organic group is substituted, it may contain any functional group compatible with the formation of a diazonium salt. Preferred functional groups include, but are not limited to, R, OR, COR, COOR, OCOR, carboxylate salts such as COOLi, COONa, COOK, COO$^-$NR$_4^+$, halogen, CN, NR$_2$, SO$_3$H, sulfonate salts such as SO$_3$Li, SO$_3$Na, SO$_3$K, SO$_3^-$NR$_4^+$, OSO$_3$H, OSO$_3^-$ salts, NR(COR), CONR$_2$, NO$_2$, PO$_3$H$_2$, phosphonate salts such as PO$_3$HNa and PO$_3$Na$_2$, phosphate salts such as OPO$_3$HNa and OPO$_3$Na$_2$, N=NR, NR$_3^+$X$^-$, PR$_3^+$X$^-$, S$_k$R, SSO$_3$H, SSO$_3^-$ salts, SO$_2$NRR', SO$_2$SR, SNRR', SNQ, SO$_2$NQ, CO$_2$NQ, S-(1,4-piperazinediyl)-SR, 2-(1,3-dithianyl) 2-(1,3-dithiolanyl), SOR, and SO$_2$R. R and R', which can be the same or different, are independently hydrogen, branched or unbranched C$_1$–C$_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion X$^-$ is a halide or an anion derived from a mineral or organic acid. Q is (CH$_2$)$_w$, (CH$_2$)$_x$O(CH$_2$)$_z$, (CH$_2$)$_x$NR(CH$_2$)$_z$, or (CH$_2$)$_x$S(CH$_2$)$_z$, where w is an integer from 2 to 6 and x and z are integers from 1 to 6.

A preferred organic group is an aromatic group of the formula A$_y$Ar—, which corresponds to a primary amine of the formula A$_y$ArNH$_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are NH$_2$—C$_6$H$_4$—, CH$_2$CH$_2$—C$_6$H$_4$—NH$_2$, CH$_2$—C$_6$H$_4$—NH$_2$, and C$_6$H$_5$.

Another preferred set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples of these acidic groups and their salts are discussed above. Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Amines represent examples of ionizable functional groups that form cationic groups. For example, amines may be protonated to form ammonium groups in acidic media. Preferably, an organic group having an amine substituent has a pKb of less than 5. Quaternary ammonium groups (—NR$_3^+$) and quaternary phosphonium groups (—PR$_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, (C$_5$H$_4$N)C$_2$H$_5^+$, C$_6$H$_4$(NC$_5$H$_5$)$^+$, C$_6$H$_4$COCH$_2$N(CH$_3$)$_3^+$, C$_6$H$_4$COCH$_2$(NC$_5$H$_5$)$^+$, (C$_5$H$_4$N)CH$_3^+$, and C$_6$H$_4$CH$_2$N(CH$_3$)$_3^+$.

An advantage of the carbon black products having an attached organic group substituted with an ionic or an ionizable group is that the carbon black product may have increased water dispersability relative to the corresponding untreated carbon black. Water dispersibility of a carbon black product increases with the number of organic groups attached to the carbon black having an ionizable group or the number of ionizable groups attached to a given organic group. Thus, increasing the number of ionizable groups associated with the carbon black product should increase its water dispersibility and permits control of the water dispersibility to a desired level. It can be noted that the water dispersibility of a carbon black product containing an amine as the organic group attached to the carbon black may be increased by acidifying the aqueous medium.

Because the water dispersibility of the carbon black products depends to some extent on charge stabilization, it is preferable that the ionic strength of the aqueous medium be less than 0.1 molar. More preferably, the ionic strength is less than 0.01 molar.

When such a water dispersible carbon black product is prepared, it is preferred that the ionic or ionizable groups be ionized in the reaction medium. The resulting product solution or slurry may be used as is or diluted prior to use. Alternatively, the carbon black product may be dried by techniques used for conventional carbon blacks. These techniques include, but are not limited to, drying in ovens and rotary kilns. Overdrying, however, may cause a loss in the degree of water dispersibility.

In addition to their water dispersibility, carbon black products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of preferred organic groups. Carbon black products having aromatic sulfide groups are particularly useful in rubber compositions. These aromatic sulfides can be represented by the formulas $Ar(CH_2)_qS_k(CH_2)_rAr'$ or $A\text{-}(CH_2)_qS_k(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazolylene groups. Preferred aryl groups include phenyl, naphthyl and benzothiazolyl. The number of sulfurs present, defined by k preferably ranges from 2 to 4. Preferred carbon black products are those having an attached aromatic sulfide organic group of the formula $—(C_6H_4)—S_k—(C_6H_4)—$, where k is an integer from 1 to 8, and more preferably where k ranges from 2 to 4. Particularly preferred aromatic sulfide groups are bis-para-$(C_6H_4)—S_2—(C_6H_4)—$ and para-$(C_6H_4)—S_2—(C_6H_5)$. The diazonium salts of these aromatic sulfide groups may be conveniently prepared from their corresponding primary amines, $H_2N—Ar—S_k—Ar'—NH_2$ or $H_2N—Ar—S_k—Ar''$. Preferred groups include dithiodi-4,1-phenylene, tetrathiodi-4,1-phenylene, phenyidithiophenylene, dithiodi-4,1-(3-chlorophenylene), $—(4\text{-}C_6H_4)—S—S—(2\text{-}C_7H_4NS)$, $—(4\text{-}C_6H_4)—S—S—(4\text{-}C_6H_4)—OH$, $—6\text{-}(2\text{-}C_7H_3NS)—SH$, $—(4\text{-}C_6H_4)—CH_2CH_2—S—S—CH_2CH_2—(4\text{-}C_6H_4)—$, $—(4\text{-}C_6H_4)—CH_2CH_2—S—S—S—CH_2CH_2\text{-}(4\text{-}C_6H_4)—$, $—(2\text{-}C_6H_4)—S—S—(2\text{-}C_6H_4)—$, $—(3\text{-}C_6H_4)—S—S—(3\text{-}C_6H_4)—$, $—6\text{-}(C_6H_3N_2S)$, $—6\text{-}(2\text{-}C_7H_3NS)—S—NRR'$ where RR' is $—CH_2CH_2OCH_2CH_2—$, $—(4\text{-}C_6H_4)—S—S—S—S—(4\text{-}C_6H_4)—$, $—(4\text{-}C_6H_4)—CH=CH_2$, $—(4\text{-}C_6H_4)—S—SO_3H$, $—(4\text{-}C_6H_4)—SO_2NH(4\text{-}C_6H_4)—S—S—(4\text{-}C_6H_4)\text{-}NHSO_2\text{-}(4\text{-}C_6H_4)—$, $—6\text{-}(2\text{-}C_7H_3NS)—S—S—2\text{-}(6\text{-}C_7H_3NS)—$, $—(4\text{-}C_6H_4)S—CH_2—(4\text{-}C_6H_4)—$, $—(4\text{-}C_6H_4)—SO_2—S—(4\text{-}C_6H_4)—$, $—(4\text{-}C_6H_4)—CH_2—S—CH_2\text{-}(4\text{-}C_6H_4)—$, $—(3\text{-}C_6H_4)CH_2—S—CH_2\text{-}(3\text{-}C_6H_4)—$, $—(4\text{-}C_6H_4)—CH_2—S—S—CH_2\text{-}(4\text{-}C_6H_4)—$, $—(3\text{-}C_6H_4)—CH_2—S—S—CH_2\text{-}(3\text{-}C_6H_4)—$, $—(4\text{-}C_6H_4)—S—NRR'$ where RR' is $—CH_2CH_2OCH_2CH_2—$, $—(4\text{-}C_6H_4)—SO_2NH—CH_2CH_2S—S—CH_2CH_2—NHSO_2\text{-}(4\text{-}C_6H_4)—$, $—(4\text{-}C_6H_4)\text{-}2\text{-}(1,3\text{-dithianyl;})$, and $—(4\text{-}C_6H_4)—S—(1,4\text{-piperizinediyl})—S—(4\text{-}C_6H_4)—$.

Another preferred set of organic groups which may be attached to the carbon black are organic groups having an aminophenyl, such as $(C_6H_4)—NH_2$, $(C_6H_4)—CH_2\text{-}(C_6H_4)—NH_2$, $(C_6H_4)—SO_2\text{-}(C_6H_4)—NH_2$. Preferred organic groups also include aromatic sulfides, represented by the formulas $Ar—S_n—Ar'$ or $Ar—S_n—Ar''$, wherein Ar and Ar' are independently arylene groups, Ar" is an aryl and n is 1 to 8. Methods for attaching such organic groups to carbon black and further discussion on organic groups are discussed in U.S. patent application Ser. Nos. 08/356,660, 08/572,525, and 08/356,459, the disclosures of which are fully incorporated by reference herein.

As stated earlier, the silicon-treated carbon black may also be modified to have at least one organic group attached to the silicon-treated carbon black. Alternatively, a mixture of silicon-treated carbon black and a modified carbon black having at least one attached organic group may be used.

Furthermore, it is within the bounds of this application to also use a mixture of silica and silicon-treated carbon black. Also, any combination of additional components with the modified carbon black may be used such as one or more of the following:

a) silicon-treated carbon black with an attached organic group optionally treated with silane coupling agents;

b) clay;

c) silica;

d) modified silica, for example, having an attached organic group, and/or e) carbon black.

Examples of silica include, but are not limited to, silica, precipitated silica, amorphous silica, vitreous silica, fumed silica, fused silica, silicates (e.g., alumino silicates) and other Si containing fillers such as clay, talc, wollastonite, etc. Silicas are commercially available from such sources as Cabot Corporation under the Cab-O-Sil® tradename; PPG Industries under the Hi-Sil and Ceptane tradenames; Rhone-Poulenc under the Zeosil tradename; and Degussa AG under the Ultrasil and Coupsil tradenames.

The particles resulting from the process of the present invention comprise polymer and modified carbon black. One type of particle resulting from the process of the present invention is a particle having a polymer mass as its core and a shell comprising a mixture of polymer and modified carbon black. Generally, this type of particle occurs when a sticky polymer is made such as EPDM.

The use of the modified carbon black as part of the present invention has significantly different surface properties than the fillers typically used in gas-phase polymerization which are conventional silica or carbon black. These differences in surface chemistry can favorably influence the performance of the modified carbon black in the gas-phase polymerization. For instance, EPDM which is made from gas-phase polymerization is used in radiator hoses. It is expected that the modified carbon blacks when used in the process of the present invention will produce an EPDM product containing the modified carbon black and provide a hose compound having reduced electrical conductivity which in turn reduces the tendency for electrochemical degradation which is a recognized problem in the automotive industry.

Furthermore, using the modified carbon blacks in the process of the present invention is expected to lead to improved tear resistance, for instance, of the EPDM compound. This provides an additional advantage for the EPDM made by gas-phase polymerization in such industries as the roofing market.

Furthermore, the introduction of the modified carbon blacks in a gas-phase polymerization of such polymers as polybutadiene polymers or copolymers, can be advantageous for tire manufacturers since the product can be mixed more easily in the form that is produced by gas-phase polymerization. Using the modified carbon blacks in the gas-phase polymerization will produce a product which, when used in tires, provides a desirable balance of rolling resistance, handling, and wear as described in U.S. patent applications Ser. Nos. 08/446,140 and 08/446,141.

In addition, since some of the modified carbon blacks used in the gas-phase polymerization described in this invention are particulates comprising silicon-containing species such as silica and carbon black, it is expected that the use of the modified carbon blacks of this type will provide the advantages offered by silica and carbon black at the same time.

The following examples illustrate the invention without limitation.

EXAMPLES

Example 1

Silicon-treated carbon blacks according to the present invention were prepared using a pilot scale reactor generally as described above, and as depicted in FIG. 1 and having the dimensions set forth below: $D_1$=4 inches, $D_2$=2 inches, $D_3$=5 inches, $L_1$=4 inches, $L_2$=5 inches, $L_3$=7 inches, $L_4$=1 foot and Q=4.5 feet. The reaction conditions set forth in Table 1 below, were employed.

These conditions result in the formation of a carbon black identified by the ASTM designation N234. A commercially available example of N234 is Vulcan® 7H from Cabot Corporation, Boston, Mass. These conditions were altered by adding a volatilizable silicon-containing compound into the reactor, to obtain a silicon-treated carbon black. The flow rate of the volatilizable compound was adjusted to alter the weight percent of silicon in the treated carbon black. The weight percent of silicon in the treated carbon black was determined by the ashing test, conducted according to ASTM procedure D-1506.

One such new treated carbon black was made by injecting an organo-silicon compound, namely octamethyl-cyclotetrasiloxane (OMTS), into the hydrocarbon feedstock. This compound is sold as "D4" by Dow Corning Corporation, Midland, Mich. The resultant silicon-treated carbon black is identified herein as OMTS-CB. A different silicon-treated carbon black (TEOS-CB) was prepared by introducing a second silicon-containing volatilizable compound, tetraethoxy silane, (sold as TEOS, by Huls America, Piscataway, N.J.), into the hydrocarbon feedstock. Since changes in reactor temperature are known to alter the surface area of the carbon black, and reactor temperature is very sensitive to the total flow rate of the feedstock in the injection zone (zone 3 in FIG. 1), the feedstock flow rate was adjusted downward to approximately compensate for the introduction of the volatilizable silicon-containing compound, such that a constant reactor temperature was maintained. This results in an approximately constant external surface area (as measured by t area) for the resultant carbon blacks. All other conditions were maintained as necessary for manufacturing N234 carbon black. A structure control additive (potassium acetate solution) was injected into the feedstock to maintain the specification structure of the N234 carbon black. The flow rate of this additive was maintained constant in making the silicon-treated carbon blacks described throughout the following examples.

The external surface area (t-area) was measured following the sample preparation and measurement procedure described in ASTM D3037—Method A for Nitrogen surface area. For this measurement, the nitrogen adsorption isotherm was extended up to 0.55 relative pressure. The relative pressure is the pressure (P) divided by the saturation pressure ($P_O$) (the pressure at which the nitrogen condenses). The adsorption layer thickness ($t_l$) was then calculated using the relation:

$$t_l = \frac{13.99}{\sqrt{0.034 - \log(P/P_0)]}}$$

The volume (V) of nitrogen adsorbed was then plotted against $t_1$. A straight line was then fitted through the data points for $t_1$ values between 3.9 and 6.2 Angstroms. The t-area was then obtained from the slope of this line as follows:

$t$-area, m$^2$/gm=15.47×slope

TABLE 1

| | Carbon Black | | |
| Conditions | N234 | TEOS-CB | OMTS-CB |
| --- | --- | --- | --- |
| Air Rate, kscfh | 12.8 | 12.8 | 12.8 |
| Gas Rate, kscfh | 0.94 | 0.94 | 0.94 |
| feedstock rate, lbs/lhr | 166 | 139 | 155 |
| Si compound rate, lbs/hr | 0 | 16 | 5 |

The resultant carbon blacks were analyzed for surface area and silicon content. These values are set forth in Table 2 below:

TABLE 2

| | Carbon Black | | |
| Properites | N234 | TEOS-CB | OMTS-CB |
| --- | --- | --- | --- |
| % Silicon in Carbon Black | 0.02 | 2.85 | 2.08 |
| DBP, cc/100 g | 125.0 | 114.0 | 115.0 |
| CDBP, cc/100 g | 101.5 | 104.1 | 103.5 |
| t-Area, m$^2$/g | 117.0 | 121.0 | 121.0 |
| N2 area, m$^2$/g | 120.4 | 136.0 | 133.0 |

Example 2

A scanning transmission electron microscope (STEM) coupled to an energy dispersive X-ray analyzer, was used to further characterize the silicon-treated carbon black. The following Table 3 compares N234, OMTS-CB (prepared according to Example 1) and N234 to which 3.7% by weight silica (L90, sold as CAB-O-SIL® L90, by Cabot Corporation, Boston, Mass.) was added to form a mixture. As described below, the STEM system may be used to examine an individual aggregate of carbon black for elemental composition. A physical mixture of carbon black and silica will result in the identification of silica aggregates which show mostly silicon signal and little or background carbon signal. Thus, when multiple aggregates are examined in a mixture, some of the aggregates will show a high Si/C signal ratio, corresponding to aggregates of silica.

Five mg of carbon black was dispersed into 20 ml of chloroform and subjected to ultrasonic energy using a probe sonicator (W-385 Heat Systems Ultra Sonicator). A 2 ml aliquot was then dispersed into 15 ml of chloroform using a probe sonicator for three minutes. The resulting dispersion was placed on a 200 mesh nickel grid with aluminum substrate. The grid was then placed under a Fisons HB501 Scanning Transmission Electron Microscope (Fisons, West Sussex, England) equipped with an Oxford Link AN10000 Energy Dispersive X-ray Analyzer (Oxford Link, Concord, Mass.).

Initially the grid was scanned for potential silica aggregates at low magnification (less than 200,000×). This was done by searching for aggregates that had a Si/C count ratio greater than unity. After this initial scan, typically thirty aggregates were selected for detailed analysis at higher magnification (from between 200,000× and 2,000,000×). The selected aggregates included all of the aggregates which contained Si/C count ratios greater than unity, as identified by the initial scan. The highest ratios of Si/C counts thus determined are set forth in Table 3 for N234, OMTS-CB and a mixture of N234 and silica.

TABLE 3

Ratio of Si/C Signal Measured with STEM

|  | % Si in Modified Sample | Highest Ratio of Si/C Counts per Aggregate |
|---|---|---|
| N234 | 0 | 0.02 |
| OMTS-CB | 3.28 | 0.27 |
| N234 + 3.7% silica (L90) | 1.7 | 49 |

Thus, a well dispersed mixture of carbon black and silica having the same silicon content as the OMTS-CB shows 180 times higher peak Si/C counts. This data shows that the OMTS-CB carbon black is not a simple physical mixture of silica and carbon black, but rather that the silicon is a part of the intrinsic chemical nature of the carbon black.

Example 3

HF Treatment

Hydrofluoric acid (HF) is able to dissolve silicon compounds but does not react with carbon. Thus, if either a conventional (untreated) carbon black or a mixture of silica and carbon black is treated with HF, the surface and surface area of the carbon black will remain unchanged, because it is unaffected by the dissolution of the silicon compounds removed from the mixture. However, if silicon containing species are distributed throughout at least a portion, including the surface, of the carbon black aggregate, the surface area will markedly increase as micropores are formed as the silicon compound is dissolved out of the carbon black structure.

Five grams of the carbon black to be tested were extracted with 100 ml of 10% v/v hydrofluoric acid for 1 hour. The silicon content and nitrogen surface area were measured before and after the HF treatment. The results are shown in Table 4.

TABLE 4

| | HF Treatment | | | |
|---|---|---|---|---|
| | % SI Before HF Treatment | % Si After HF Treatment | $N_2SA$ Before HF Treatment | $N_2SA$ After HF Treatment |
| N234 | 0.02 | 0.05 | 123 | 123 |
| OMTS-CB | 3.3 | 0.3 | 138 | 180 |

Photomicrographs were taken of the carbon black samples before and after HF treatment. The photomicrographs are shown in FIGS. 4a–4d. These photographs show that the silicon-treated carbon blacks have a rougher surface, consistent with increased microporosity after the HF treatment, compared to the untreated carbon black.

Example 4

Another silicon-treated carbon black was made by injecting TEOS into the reaction zone of the reactor immediately (one foot) downstream from the hydrocarbon feedstock injection plane, as indicated at injection point 12 in FIG. 1. All other reaction conditions were maintained as required for manufacturing N234 black, as described in Example 1. The TEOS flow rate was adjusted to 17.6 lbs per hour.

The resultant black was analyzed for silicon content and surface area, before and after HF extraction as described in Example 3. The results are described in Table 4A.

TABLE 4A

TEOS-CB'-manufactured by injection of TEOS into reaction zone

| | % Si | $N_2$ Area |
|---|---|---|
| Before HF | 2.27 | 127.7 |
| After HF | 0.04 | 125.8 |

Thus, no increase in $N_2$ surface area was seen after HF extraction of the TEOS-CB'. Analysis of the aggregates by the STEM procedure described in Example 2 also showed silicon to be present in the aggregates and not as independent silica entities. These results show that in this case the silicon-containing species of the silicon-treated carbon blacks are primarily located near the surface.

Example 5

Preparation of a Carbon Black Product With Preformed Diazonium Salt

This example illustrates the preparation of a carbon black product of the present invention. A pelleted carbon black with a surface area of 230 $m^2/g$ and a DBPA of 64 ml/100 g was used. An aqueous solution of 4-bromobenzenediazonium chloride was prepared from 0.688 g of 4-bromoaniline, 0.300 g of sodium nitrite, 1.38 g of concentrated HCl and 2.90 g of water at <5° C. This solution was added to a suspension of 10 g of the pelleted carbon black in 60 g of water at room temperature. Bubbles were released. After stirring for 60 minutes, the resulting carbon black product was removed by filtration, washed with water and subjected to Soxhlet extraction with tetrahydrofuran (THF) overnight. Analysis of the carbon black product after extraction showed that it contained 2.49% bromine, compared to <0.01% for the untreated pelleted carbon black prior to use in this example. This corresponds to 78% of the bromophenyl groups being attached to the carbon black product. Therefore, the carbon black product has 0.31 mmol/g of attached bromophenyl groups.

Examples 6–8

Preparation of a Carbon Black Product with Preformed Diazonium Salt

These examples illustrate additional methods for the preparation of carbon black products of the present invention. The pelleted carbon black used in Example 5 was used in Examples 6–8. An aqueous solution of 4-bromobenzenediazonium chloride was prepared from 0.688 g of 4-bromoaniline, 0.300 g of sodium nitrite, 1.38 g of concentrated HCl and 2.90 g of water at <5° C. This solution was added to a suspension of 10 g of the pelleted carbon black in 60.5 g of a 0.826% NaOH solution at the temperature indicated. Bubbles were released. After stirring for the time indicated in the following table, the resulting carbon black product was removed by filtration, washed with water and subjected to Soxhlet extraction with THF overnight. Bromine analysis of the product after extraction showed that a substantial fraction of the bromophenyl groups had been attached to the carbon black product. This shows that the preparation of carbon black products according to the invention can be carried our at different times, temperatures and pHs.

| Example | Tempera- ture, C. | Time, min. | Bromine, % | Portion of bromophenyl retained, % | Bromophenyl groups, mmol/g |
| --- | --- | --- | --- | --- | --- |
| 2 | <5 | 5 | 1.88 | 59 | 0.24 |
| 3 | <5 | 60 | 2.15 | 67 | 0.27 |
| 4 | Ambient | 60 | 2.45 | 77 | 0.31 |

Example 9

Preparation of a Carbon Black Product with a Diazonium Salt Generated in situ

This example further illustrates the preparation of a carbon black product of the present invention. A fluffy carbon black with a surface area of 560 m2/g, a DBPA of 90 ml/100 g and a volatile content of 9.5% was used. Fifty grams of the fluffy carbon black were added to a solution of 8.83 g of sulfanilic acid dissolved in 420 g of water. The resulting suspension was cooled to room temperature. Nitrogen dioxide (5.16 g) was dissolved in 30 g of ice cold water, and then added to the fluffy carbon black suspension over a period of several minutes and stirred rapidly, to produce 4-sulfobenzenediazonium inner salt in situ, which reacts with the fluffy carbon black. The resulting dispersion was dried in an oven at 125° C., leaving only the carbon black product. The carbon black product contained 1.94% sulfur after Soxhlet extraction with ethanol overnight, compared to 0.24% sulfur for the untreated carbon black. This corresponds to attaching 52% of the p-C6H4SO3— groups to the carbon black product. Therefore, the carbon black product had 0.53 mmol/g of attached p-$C_6H_4SO_3$— groups.

Example 10

Preparation of a Carbon Black Product

This example illustrates another method for the preparation of a carbon black product of the present invention. Sulfanilic acid (2.13 g) was dissolved in 90 g of water with stirring and heating. Ten grams of a carbon black with a CTAB surface area of 350 m2/g and a DBPA of 120 ml/100 g were added. The mixture was cooled to room temperature and isobutyl nitrite (1.27 g) was added. Bubbles were released. 4-Sulfobenzene diazonium hydroxide inner salt was generated in situ and it reacted with the carbon black. The mixture was stirred for 30 minutes, and dried in an oven at 125° C. A sample of the resulting carbon black product that had been subjected to Soxhlet extraction with ethanol overnight contained 2.02% sulfur, compared to 0.5% for the untreated carbon black. Therefore, the carbon black product had 0.48 mmol/g of attached p-$C_6H_4SO_3$— groups.

Example 11

Preparation of a Carbon Black Product in an Aprotic Solvent

This example illustrates the preparation of a treated carbon black product of the present invention in an aprotic solvent. A 0.1 M solution of tetrabutylammonium hexafluorophosphate in anhydrous acetonitrile was prepared and allowed to stand overnight over 3A molecular sieves. A 5.4% solution of chlorobenzenediazonium hexafluorophosphate in anhydrous acetonitrile was prepared and allowed to stand overnight over 3A molecular sieves. A carbon black with a surface area of 230 m2/g and a DBPA of 70 ml/100 g was dried at 150° C. under nitrogen for 4 hours. The carbon black (10 g) was stirred into 80 mL of the tetrabutylammonium hexafluorophosphate solution. The diazonium solution (21 g) was added, and the mixture was stirred for four hours. The carbon black product was recovered by filtration and was washed with anhydrous acetonitrile. All operations up to this point were carried out in a dry box under an argon atmosphere. A sample of the carbon black product that was subjected to Soxhlet extraction overnight with THF and dried had a chlorine content of 0.76%, compared to 0.02% for the untreated carbon black. Therefore, the carbon black product had 0.21 mmol/g of attached chlorophenyl groups.

Example 12

Preparation of a Carbon Black Product in an Aprotic Solvent

This example illustrates the preparation of a treated carbon black product of the present invention in an aprotic solvent. A carbon black with a surface area of 230 m2/g and a DBPA of 70 ml/100 g was heated at 950° C. under nitrogen for one hour. A 0.1 M solution of tetrabutylammonium tetrafluoroborate in anhydrous benzonitrile was prepared and allowed to stand overnight over 3A molecular sieves. Using glassware dried at 160° C. under argon, the carbon black (6 g) was stirred into 50 mL of the tetrabutylammonium tetrafluoroborate solution. 4-Bromobenzenediazonium tetrafluoroborate was added, and the mixture was stirred for 15 minutes. The carbon black product was recovered by filtration and was washed twice with anhydrous benzonitrile and twice with hexanes. Except for the initial drying of the carbon black, all operations up to this point were carried out under an argon atmosphere in a dry box. A sample of the carbon black product that was subjected to Soxhlet extraction overnight with THF and dried had a bromine content of 0.85%, compared to <0.01% for the untreated carbon black. Therefore, the carbon black product had 0.11 mmol/g of attached bromophenyl groups.

Example 13

Preparation of a Carbon Black Product with a Diazonium Salt Generated in situ

This example illustrates another method for the preparation of a carbon black product of the present invention. A fluffy carbon black with a surface area of 560 m2/g, a DBPA of 90 ml/100 and a volatile content of 9.5% was used. Fifty grams of the fluffy carbon black were added to a solution of 8.83 g of sulfanilic acid dissolved in 420 g of water. The resulting suspension was cooled to 30° C. and 4.6 g of concentrated nitric acid was added. An aqueous solution containing 3.51 g of sodium nitrite was then added gradually with stirring, forming 4-sulfobenzenediazonium hydroxide inner salt in situ, which reacts with the fluffy carbon black. The resulting product was dried in an oven at 125° C., leaving the carbon black product. The carbon black product contained 1.97% sulfur after Soxhlet extraction with ethanol overnight, compared to 0.24% sulfur for the untreated fluffy carbon black. This corresponds to attaching 53% of the p-$C_6H_4SO_3$— groups to the carbon black product. Therefore, the carbon black product had 0.54 mmol/g of attached p-$C_6H_4SO_3$— groups.

Example 14

Preparation of a Carbon Black Product with an Aliphatic Diazonium Salt

This example shows another method for the preparation of a carbon black product of the present invention. A fluffy carbon black with a surface area of 230 m2/g and a DBPA of 70 ml/100 g was used. Twenty grams of this black were added to a solution of 4.9 g of 2-aminoethanesulfonic acid in 180 g of water. Concentrated nitric acid (4.32 g) was added. A solution of 3.33 g of sodium nitrite in 15 g of water was added slowly with stirring, forming 2-sulfoethanediazonium nitrate in situ, which reacted with the fluffy carbon black. A large quantity of bubbles evolved. The product was dried in an oven at 135° C., leaving a carbon black product. The resulting carbon black product contained 1.68% sulfur after Soxhlet extraction with ethanol overnight, compared to 0.4% for the untreated fluffy carbon black. This corresponds to attaching 20% of the $C_2H_4SO_3$— groups to the carbon black product. Therefore, the carbon black product had 0.40 mmol/g of attached $C_2H_4SO_3$— groups.

Example 15

Preparation of a Carbon Black Product with a Benzyldiazonium Salt

This example shows another method for the preparation of a carbon black product of the present invention. A suspension of 0.676 g of 4-bromobenzyl amine, 0.60 g of concentrated HCl, 30 g of water and 10.22 g of the untreated carbon black used in Example 7 was prepared in an ice bath. An aqueous solution containing 0.269 g of sodium nitrite was added and the resulting suspension was stirred for 15 minutes, forming 4-bromophenylmethanediazonium chloride in situ, which reacted with the untreated carbon black. The product was filtered off, and was subjected to Soxhlet extraction with THF overnight. The resulting carbon black product contained 0.26% bromine, compared to <0.01% for the untreated carbon black product. This shows that 9% of the bromobenzyl groups used in the example became attached to the carbon black product. Therefore, the carbon black product had 0.031 mmol/g of attached bromobenzyl groups.

Example 16

Preparation of a Carbon Black Product

This example illustrates the preparation of a carbon black product of the present invention. Ten grams of a carbon black with a surface area of 230 m2/g and a DBPA of 70 ml/100 g was added to a stirring solution of 0.8 g 4-bromobenzamide and 90 ml of acetone in 90 g of water. Concentrated HCl (0.87 g) was added followed by 0.33 g of $NaNO_2$. $BrC_6H_4CON_2^+$ was formed in situ, which reacted with the carbon black. After stirring for 30 minutes, the mixture was allowed to stand overnight and was then dried in an oven at 125° C. A sample of the product that had been subjected to Soxhlet extraction with THF overnight and dried contained 0.22% bromine, compared to <0.01% bromine for the unreacted carbon black.

Example 17

Preparation of a Carbon Black Product with a Preformed Diazonium Salt in a Pin Pelletizer This example shows another method for the preparation of a carbon black product of the present invention. A pin pelletizer was charged with 400 g of a fluffy carbon black with a surface area of 80 m2/g and a DBPA of 85 ml/100 g. A cold suspension of 4-sulfobenzenediazonium hydroxide inner salt prepared from 27.1 g of the sodium salt of sulfanilic acid, 10.32 g of sodium nitrite, 29.0 g of concentrated HCl and 293.5 g of water and was added to the pelletizer. After pelletizing for 2 minutes, the sample was removed and dried at 115° C. to constant weight. Soxhlet extraction with ethanol overnight gave a carbon black product containing 1.1% sulfur, compared against 0.8% for the untreated carbon black. This shows that 27% of the p-$C_6H_4SO_3$— groups were attached to the carbon black product. Therefore, the carbon black product had 0.09 mmol/g of attached p-$C_6H_4SO_3$— groups.

Example 18

Preparation of a Carbon Black Product in a Pin Pelletizer with a Diazonium Salt Generated in situ This example illustrates another method for preparing a carbon black product of the present invention. A pin pelletizer was charged with 200 g of a carbon black with a CTAB surface area of 350 m2/g and a DBPA of 120. A solution of 44.2 g of sodium sulfanilate in 95 g of water at 70° C. was added and the pelletizer was run for one minute. Twenty grams of water was added followed by 39.6 g of concentrated nitric acid. The pelletizer was run for an additional minute. Twenty grams of water was added followed by a solution of 16.76 g of sodium nitrite in 35 g of water, forming 4-sulfobenzenediazonium hydroxide inner salt in situ, which reacted with the carbon black. After running the pelletizer for five minutes, a solution of 11.22 g of sodium hydroxide in 35 g of water was added. The pelletizer was run for an additional two minutes and the resulting a carbon black product was subsequently dried. Soxhlet extraction with ethanol overnight gave a carbon black product with 3.3% sulfur, compared against 0.5% for the untreated carbon black. This shows that 77% of the p-C6H4SO3— groups were attached to the carbon black product. Therefore, the carbon black product had 0.88 mmol/g of attached p-$C_6H_4SO_3$— groups.

Example 19

Preparation of a Carbon Black Product in a Pin Pelletizer with a Diazonium Salt Generated in situ This example further illustrates the preparation of a carbon black product of the present invention. A pin pelletizer was charged with 200 g of a carbon black product with a surface area of 560 m2/g, a DBPA of 90 ml/100 g and a volatile content of 9.5%. Water (60 g), concentrated nitric acid (25.2 g), sulfanilic acid (40.4 g) and a solution of 19.7 g of sodium nitrite in 35 g of water were added successively; the pelletizer was run for one minute after each addition. 4-Sulfobenzenediazonium hydroxide inner salt was generated in situ, and it reacted with the carbon black. After standing for five minutes, the resulting carbon black product was dried at 125° C. A sample of the carbon black product was subjected to Soxhlet extraction with ethanol overnight. It contained 2.15% sulfur compared to 0.24% for the untreated carbon black. This shows that 51% of the p-$C_6H_4SO_3$— groups were attached to the carbon black product. Therefore, the carbon black product had 0.60 mmol/g of attached p-$C_6H_4SO_3$— groups.

Example 20

Preparation of a Carbon Black Product in a Pelletizer with a Diazonium Salt Generated in situ This example illustrates another method for the preparation of a carbon black product of the present invention. A carbon black (200 g) with a CTAB surface area of 350 m2/g and a DBPA of 120 ml/100 g and 42.4 g sulfanilic acid were placed in a pin pelletizer. After mixing for 40 seconds, a solution of 20.7 $NaNO_2$ in 150 g of water was then added. 4-sulfobenzene diazonium hydroxide inner salt was formed in situ, which reacted with the carbon black. After mixing for 45 seconds, the resulting carbon black product was dried in an oven at 120° C. A sample of the product that had been subjected to Soxhlet extraction overnight with ethanol contained 3.47% sulfur, compared to 0.5% sulfur for the untreated carbon black product. Therefore, the carbon black product has 0.93 mmol/g of attached p-$C_6H_4SO_3$— groups.

Example 21

Preparation of a Carbon Black Product in a Continuous Pin Pelletizer with a Diazonium Salt Generated in situ This example illustrates another method for preparing a carbon black product of the present invention. A carbon black with a CTAB surface area of 133 m2/g and a fluffy DBPA of 190 ml/100 g is introduced into a continuously operating pin pelletizer at a rate of 100 parts by weight per hour. Simultaneously, a 30% solution of sodium nitrite in water and a suspension containing 5.43% concentrated nitric acid, 8.72% sulfanilic acid and 85.9% water are introduced into the pelletizer. The sodium nitrite solution is introduced at 16 parts by weight per hour and the suspension is added at 112 parts by weight per hour. 4-Sulfobenzenediazonium hydroxide inner salt was generated in situ and it reacted with the carbon black in the pelletizer. The material leaving the pelletizer was the carbon black product. The carbon black product was dried at 125° C. A sample of the carbon black product that had been subjected to Soxhlet extraction with ethanol overnight contained 1.70% sulfur, compared to 0.42% for the untreated carbon black. Therefore, the carbon black product had 0.40 mmol/g of attached p-$C_6H_4SO_3$— groups.

Example 22

Preparation of a Carbon Black Product with a Diazonium Salt Generated in situ This example shows another method for preparing a carbon black product of the present invention. In this example, the acid for the diazotization reaction comes from the amine forming the diazonium salt, sulfanilic acid. As a result, no additional acid was required. Sulfanilic acid (2.12 g) was dissolved in 90 g water at 70° C. The solution was added to 10 g of a carbon black with a CTAB surface area of 350 m2/g and a DBPA of 120 ml/100 g, and cooled to room temperature. A solution of 1.04 g $NaNO_2$ in 10 g water was added with stirring. 4-Sulfobenzenediazonium hydroxide inner salt was generated in situ and it reacted with the carbon black to form the carbon black product. After stirring for 30 minutes, the resulting dispersion was dried in an oven at 120° C. A sample of the carbon black product that had been subjected to Soxhlet extraction with ethanol overnight contained 3.19% sulfur, compared to 0.5% for the untreated carbon black product. Therefore, the carbon black product had 0.84 mmol/g of attached p-$C_6H_4SO_3$— groups.

Example 23

Preparation of a Carbon Black Product with a Diazonium Salt Generated in situ This example illustrates another method for the preparation of a carbon black product of the present invention. In this example, the acid for the diazotization reaction comes from the amine forming the diazonium salt, sulfanilic acid. As a result, no additional acid was required. A carbon black (10 g) with a CTAB surface area of 350 m2/g and a DBPA of 120 ml/100 g was added to a boiling solution of 2.12 g sulfanilic acid in 90 g of water. A solution of 1.04 g of $NaNO_2$ in 10 g water was added cautiously. 4-Sulfobenzene diazonium hydroxide inner salt was formed in situ, which reacted with the carbon black. After stirring for about 20 min, the resulting dispersion was dried in an oven at 120° C. A sample of the product that had been subjected to Soxhlet extraction overnight with ethanol contained 3.16% sulfur, compared to 0.5% sulfur for the untreated carbon black. Therefore, the carbon black product had 0.83 mmol/g of attached p-$C_6H_4SO_3$— groups.

Other embodiments of the present invention will be apparent to those skilled in the art from consideration of the specification and practice of the invention disclosed herein. It is intended that the specification and examples be considered as exemplary only.

What is claimed is:

1. A process of making a polymer comprising:
   conducting polymerization in a fluidized bed reactor or a reactor for the gas-phase production of a polymer in the presence of a catalyst, and
   a modified carbon black, wherein said modified carbon black comprises a silicon-treated carbon black, a silica-coated carbon black, a carbon black having attached at least one organic group, a silicon-treated carbon black having attached at least one organic group, a silica-coated carbon black having attached at least one organic group, or a mixture of one or more types of modified carbon blacks, wherein said organic group comprises an aromatic group or a $C_1$–$C_{12}$ alkyl group directly attached to the modified carbon black.

2. The process of claim 1, wherein said polymerization is conducted at a polymerization reaction temperature in excess of the softening temperature of the resulting polymer.

3. The process of claim 1, wherein said modified carbon black is present in an amount of from about 0.3 to about 80 wt % based on the weight of the resulting polymer.

4. The process of claim 1, wherein said polymer is a diene-type elastomer.

5. The process of claim 1, wherein said polymer is an ethylenelpropylene/diene terpolymer rubber.

6. The process of claim 1, wherein said polymer is an ethylene/propylene copolymer.

7. The polymer resulting from the process of claim 1.

8. The polymer resulting from the process of claim 4.

9. The polymer resulting from the process of claim 5.

10. The polymer resulting from the process of claim 6.

11. A polymer particle comprising a polymer and modified carbon black, wherein said modified carbon black comprises a silicon-treated carbon black, a silica-coated carbon black, a carbon black having attached at least one organic group, a silicon-treated carbon black having attached at least one organic group, a silica-coated carbon black having attached at least one organic group, or a mixture of one or more types of modified carbon blacks, wherein said organic group comprises an aromatic group or a $C_1$–$C_{12}$ alkyl group directly attached to the modified carbon black.

12. A polymer particle comprising a polymer and a modified carbon black, wherein said polymer particle comprises a core and a shell, wherein said core comprises a polymer mass and said shell comprises a mixture of polymer and modified carbon black, wherein said modified carbon black comprises a silicon-treated carbon black, a silica-coated carbon black, a carbon black having attached at least one organic group, a silicon-treated carbon black having attached at least one organic group, a silica-coated carbon black having attached at least one organic group, or a mixture of one or more types of modified carbon blacks.

13. A hose comprising the polymer particle of claim 11.

14. A roofing material comprising the polymer particle of claim 11.

15. A tire comprising the polymer particle of claim 11.

16. The process of claim 1, wherein said modified carbon black is a silicon-treated carbon black.

17. The process of claim 1, wherein said modified carbon black is a carbon black having attached at least one organic group.

18. The process of claim 1, wherein said modified carbon black is a silicon-treated carbon black having attached at least one organic group.

19. The process of claim 1, wherein said modified carbon black is a silica-coated carbon black.

20. The process of claim 1, wherein said modified carbon black is a silica-coated carbon black having attached at least one organic group.

21. The polymer particle of claim 11, wherein said modified carbon black is a silicon-treated carbon black.

22. The polymer particle of claim 11, wherein said modified carbon black is a silica-coated carbon black.

23. The polymer particle of claim 11, wherein said modified carbon black is a silicon-treated carbon black having attached at least one organic group.

24. The polymer particle of claim 11, wherein said modified carbon black is a silica-coated carbon black having attached at least one organic group.

25. The polymer particle of claim 11, wherein said modified carbon black is a carbon black having attached at least one organic group.

26. The process of claim 1, wherein said organic group further comprises an ionic or an ionizable group.

27. The process of claim 1, wherein said organic group comprises an aromatic group directly attached to the modified carbon black.

28. The process of claim 1, wherein said organic group comprises a $C_1$–$C_{12}$ alkyl group directly attached to the modified carbon black.

29. The process of claim 1, wherein said organic group is substituted with at least one functional group.

30. The process of claim 1, wherein said organic group has the formula $A_yA_r$— wherein Ar is an aromatic radical and A is a functional group or a hydrocarbon radical and y is an integer of from 1 to the total number of —CH radicals in the aromatic radical.

31. The process of claim 1, wherein said organic group comprises an aromatic sulfide.

32. The process of claim 1, wherein said organic group comprises an aminophenyl group.

33. The polymer particle of claim 11, wherein said organic group comprises an ionic or an ionizable group.

34. The polymer particle of claim 11, wherein said organic group comprises an aromatic group directly attached to the modified carbon black.

35. The polymer particle of claim 11, wherein said organic group comprises a $C_1$–$C_{12}$ allyl group directly attached to the modified carbon black.

36. The polymer particle of claim 11, wherein said organic group is substituted with at least one functional group.

37. The polymer particle of claim 11, wherein said organic group has the formula $A_yA_r$— wherein Ar is an aromatic radical and A is a functional group or a hydrocarbon radical and y is an integer of from 1 to the total number of —CH radicals in the aromatic radical.

38. The polymer particle of claim 11, wherein said organic group comprises an aromatic sulfide.

39. The polymer particle of claim 11, wherein said organic group comprises an aminophenyl group.

* * * * *